(12) United States Patent
Papasakellariou et al.

(10) Patent No.: US 9,036,511 B2
(45) Date of Patent: May 19, 2015

(54) TRANSMISSION OF UPLINK CONTROL SIGNALS IN A COMMUNICATION SYSTEM

(75) Inventors: Aris Papasakellariou, Houston, TX (US); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 701 days.

(21) Appl. No.: 13/197,247

(22) Filed: Aug. 3, 2011

(65) Prior Publication Data
US 2012/0033587 A1    Feb. 9, 2012

Related U.S. Application Data

(63) Continuation of application No. 61/370,271, filed on Aug. 3, 2010.

(51) Int. Cl.
| H04B 7/00 | (2006.01) |
| H04L 27/26 | (2006.01) |
| H04J 13/00 | (2011.01) |
| H04L 1/16 | (2006.01) |
| H04L 1/00 | (2006.01) |
| H04L 5/00 | (2006.01) |

(52) U.S. Cl.
CPC ............. *H04L 27/2647* (2013.01); *H04J 13/00* (2013.01); *H04J 13/0003* (2013.01); *H04J 13/0059* (2013.01); *H04L 1/0026* (2013.01); *H04L 1/003* (2013.01); *H04L 1/0073* (2013.01); *H04L 1/1671* (2013.01); *H04L 5/0007* (2013.01); *H04L 27/2636* (2013.01)

(58) Field of Classification Search
None
See application file for complete search history.

(56) References Cited

U.S. PATENT DOCUMENTS

| 6,147,964 | A | 11/2000 | Black et al. | |
| 2003/0159154 | A1 | 8/2003 | Yousef et al. | |
| 2009/0225700 | A1* | 9/2009 | Shen et al. | 370/328 |
| 2009/0279493 | A1 | 11/2009 | Gaal et al. | |
| 2009/0303978 | A1 | 12/2009 | Pajukoski et al. | |
| 2010/0124290 | A1* | 5/2010 | Kablotsky | 375/259 |
| 2011/0013592 | A1* | 1/2011 | Uemura et al. | 370/331 |
| 2011/0142075 | A1* | 6/2011 | Che et al. | 370/476 |
| 2011/0243066 | A1* | 10/2011 | Nayeb Nazar et al. | 370/328 |

* cited by examiner

*Primary Examiner* — Anez Ebrahim
(74) *Attorney, Agent, or Firm* — The Farrell Law Firm, P.C.

(57) ABSTRACT

A method and apparatus of a User Equipment (UE) to simultaneously transmit information of a first type and information of a second type over a number of transmission symbols, the information of the first type and the information of the second type being respectively associated with a first Orthogonal Cover Code (OCC) and a second OCC, wherein a length of each OCC is equal to the number of transmission symbols. The method includes multiplying, at each transmission symbol, the information of the first type with a respective element of the first OCC to obtain a first output; multiplying, at each transmission symbol, the information of the second type with a respective element of the second OCC to obtain a second output; summing the first output and the second output to obtain a combined output; and transmitting the combined output.

18 Claims, 21 Drawing Sheets

TRANSMISSION OF UPLINK CONTROL SIGNALS IN A COMMUNICATION SYSTEM

PRIORITY

The present application claims priority under 35 U.S.C. §119(e) to U.S. Provisional Application No. 61/370,271, which was filed in the United States Patent and Trademark Office on Aug. 3, 2010, the entire disclosure of which is incorporated herein by reference.

BACKGROUND OF THE INVENTION

1. Field of the Invention

The present invention is directed generally to wireless communication systems and, more specifically, to multiplexing control information in a physical channel transmitted in an uplink of a communication system.

2. Description of the Art

A communication system includes a DownLink (DL) that conveys signals from a Base Station (BS or NodeB) to User Equipments (UEs), and an UpLink (UL) that conveys signals from UEs to a NodeB. A UE, also commonly referred to as a terminal or a mobile station, may be fixed or mobile and may be a wireless device, a cellular phone, a personal computer device, etc. A NodeB is generally a fixed station and may also be referred to as a Base Transceiver System (BTS), an access point, etc.

The UL carries data signals including information content, control signals providing information associated with the transmission of DL signals, and Reference Signals (RSs), which are commonly referred to as pilot signals. The DL also carries data signals, control signals, and RS.

A UL data signal provides data information and is conveyed through a respective Physical Uplink Shared CHannel (PUSCH). A UL control signal provides UL Control Information (UCI) and is conveyed through a respective Physical Uplink Control CHannel (PUCCH). However, when a UE has PUSCH transmission, it may convey UCI together with data information through the PUSCH.

A DL data signal provides data information and is conveyed through a respective Physical Downlink Shared CHannel (PDSCH). A DL control signal provides DL Control Information (DCI) and is conveyed by a respective DCI format transmitted through a respective Physical Downlink Control CHannel (PDCCH).

The UCI includes ACKnowledgment (ACK) information that is typically associated with a Hybrid Automatic Repeat reQuest (HARQ) process (HARQ-ACK). The HARQ-ACK information is usually transmitted by a UE in response to the reception of data Transport Blocks (TBs) conveyed via the PDSCH. Multiple HARQ-ACK information bits may be conveyed by a UE corresponding to positive acknowledgments (ACKs), negative acknowledgements (NACKs), or absence of reception, i.e., Discontinuous Transmission (DTX), in response to the correct, incorrect, or no reception of TBs, respectively, by the UE.

The UCI also includes Channel State Information (CSI), which may include Channel Quality Information (CQI), a Precoding Matrix Indicator (PMI), or a Rank Indicator (RI). The CQI provides the NodeB with a measure of the Signal to Interference and Noise Ratio (SINR) the UE experiences over sub-bands (Sub-band CQI) or over the whole (wideband CQI) DL operating BandWidth (BW). This measure is typically in the form of the highest Modulation and Coding Scheme (MCS) for which a predetermined BLock Error Rate (BLER) can be achieved for the transmission of TBs to the UE. The PMI/RI informs the NodeB how to combine the signal transmission to the UE from multiple NodeB antennas using the Multiple-Input Multiple-Output (MIMO) principle.

FIG. 1 is a diagram illustrating a conventional PUCCH subframe structure. Specifically, FIG. 1 illustrates a PUCCH transmission structure in a UL Transmission Time Interval (TTI), which for simplicity, is assumed to consist of one subframe.

Referring to FIG. 1, subframe 110 includes two slots 120. Each slot 120 includes $N_{symb}^{UL}$ symbols 130, where $N_{symb}^{UL}=7$, used to transmit HARQ-ACK, CSI, or RS. The PUCCH transmission in the first slot is typically at a different BW part than the PUCCH transmission in the second slot in order to obtain frequency diversity. Some symbols in each slot may be used to transmit RS in order to provide channel estimation and enable coherent demodulation of the HARQ-ACK or CSI signal. The transmission BW includes frequency resource units, which are referred to as Physical Resource Blocks (PRBs). Each PRB includes $N_{sc}^{RB}$ sub-carriers, or Resource Elements (REs). Each PUCCH transmission is over one PRB 140. The last subframe symbol may be used to transmit a Sounding RS (SRS) 150, which provides the NodeB with an estimate of the UL SINR experienced by the UE.

FIG. 2 illustrates a conventional PUCCH structure in one subframe slot for HARQ-ACK signal transmission including 1 or 2 HARQ-ACK information bits.

Referring to FIG. 2, the HARQ-ACK bits 220 modulate a Constant Amplitude Zero Auto-Correlation (CAZAC) sequence 240 with Binary Phase Shift Keying (BPSK) for 1 HARQ-ACK information bit or with Quaternary Phase Shift Keying (QPSK) for 2 HARQ-ACK information bits, which is then transmitted after performing an Inverse Fast Fourier Transform (IFFT) operation. Each RS 250 is transmitted using a non-modulated CAZAC sequence.

For $N_{sc}^{RB}=12$, CAZAC sequences of even length can be generated through a computer search for sequences satisfying the CAZAC properties. Different Cyclic Shifts (CSs) of a CAZAC sequence provide orthogonal CAZAC sequences as long as each CS value exceeds the channel propagation delay spread D (including time uncertainty errors). If $T_s$ is the duration of a PUCCH symbol, the number of CSs resulting to orthogonal CAZAC sequences is equal to $\lfloor T_s/J \rfloor$, where $\lfloor\ \rfloor$ is the "floor" function that rounds a number to its immediately lower integer. Therefore, orthogonal multiplexing of RS and HARQ-ACK signal transmissions from different UEs can be achieved by allocating different CSs of a CAZAC sequence to different UEs in the same PRB for the transmissions of their RS and HARQ-ACK signals.

For a Frequency Division Duplex (FDD) system, a UE may transmit multi-bit HARQ-ACK information, e.g., when the UE receives multiple PDSCH in multiple cells over which it communicates with the NodeB. A PDSCH may convey more than one TB in accordance with the MIMO transmission principle. For a Time Division Duplex (TDD) system, a UE may additionally receive multiple PDSCH in respectively multiple DL subframes for which the UE transmits HARQ-ACK in one UL subframe.

The number of cells a UE is configured for PDSCH reception is denoted by C and the number of configured cells for which the UE is configured MIMO reception of 2 TBs in a PDSCH is denoted by $C_2$, $C_2 \leq C$. For an FDD system, the number of HARQ-ACK information bits a UE transmits in a PUCCH is fixed and equal to $C+C_2$. For a TDD system, where HARQ-ACK for up to M PDSCH receptions in a cell is transmitted in one UL subframe, the number of HARQ-ACK information bits a UE transmits in a PUCCH is fixed and equal to M·(C+C₂). If the number of HARQ-ACK information bits exceeds a predetermined value, a UE may apply HARQ-ACK spatial domain bundling and generate 1 HARQ-ACK information bit in response to each reception of two TBs in each respective PDSCH. With HARQ-ACK spatial domain bundling, a UE generates an ACK if it correctly receives both TBs of a PDSCH and generates a NACK otherwise. Then, the number of HARQ-ACK information bits is equal to C for a FDD system and equal to M·C for a TDD system.

FIG. 3 illustrates a conventional structure for multi-bit HARQ-ACK signal transmission in a first slot based on the Discrete Fourier Transform Spread Orthogonal Frequency Division Multiplexing (DFT-S-OFDM) principle.

Referring to FIG. 3, after encoding and modulation using respectively, for example, a block code and QPSK (not shown for brevity), a set of the same HARQ-ACK bits 310 is multiplied with elements of an Orthogonal Cover Code (OCC) 330 and is subsequently DFT precoded 340. For example, for 5 symbols per slot carrying HARQ-ACK bits, the OCC has length 5 {OCC(0), OCC(1), OCC(2), OCC(3), OCC(4)} and can be either of {1, 1, 1, 1, 1}, or {1, exp(j2π/5), exp(j4π/5), exp(j6π/5), exp(j8π/5)}, or {1, exp(j4π/5), exp(j8π/5), exp(j2π/5), exp(j6π/5)}, or {1, exp(j6π/5), exp(j2π/5), exp(j8π/5), exp(j4π/5)}, or {1, exp(j8π/5), exp(j6π/5), exp(j4π/5), exp(j2π/5)}. The output is passed through an IFFT 350 and it is then mapped to a DFT-S-OFDM symbol 360. As the previous operations are linear, their relative order may be interchanged. Because the signal transmission is in 1 PRB of $N_{sc}^{RB}$=12 REs, there are 24 encoded HARQ-ACK bits transmitted in each slot with QPSK (12 HARQ-ACK QPSK symbols). The same or different HARQ-ACK bits may be transmitted in the second slot of the subframe. In addition to HARQ-ACK signals, RSs are transmitted in each slot to enable coherent demodulation of the HARQ-ACK signals. The RS is constructed from a length-12 CAZAC sequence 370, which is passed through an IFFT 380 and mapped to another DFT-S-OFDM symbol 390.

FIG. 4 illustrates a conventional UE transmitter block diagram for HARQ-ACK signals.

Referring to FIG. 4, the HARQ-ACK information bits 405 are encoded and modulated by an encoder and modulator 410 and then multiplied with an element of the OCC 425 for the respective DFT-S-OFDM symbol by multiplier 420. The output of the multiplier 420 is then precoded by DFT precoder 430. After DFT precoding, sub-carrier mapping is performed by sub-carrier mapper 440, under control of controller 450. Thereafter, the IFFT is performed by IFFT 460, a Cyclic Prefix (CP) is added by CP inserter 470, and the signal is filtered by filter 480 for time windowing, thereby generating the transmitted signal 490. For brevity, additional transmitter circuitry such as digital-to-analog converter, analog filters, amplifiers, and transmitter antennas are not illustrated in FIG. 4.

FIG. 5 illustrates a conventional NodeB receiver block diagram for HARQ-ACK signals.

Referring to FIG. 5, after receiving a Radio-Frequency (RF) analog signal and converting the analog signal to a digital signal 510, the digital signal 510 is filtered by filter 520 for time windowing and a CP is removed by CP remover 530. Subsequently, the NodeB receiver applies a Fast Fourier Transform (FFT) by FFT 540, performs sub-carrier demapping by sub-carrier demapper 550 under the control of controller 555, and applies an Inverse DFT (IDFT) by IDFT 560. The output of the IDFT 560 is then multiplied with an OCC element 575 for the respective DFT-S-OFDM symbol by multiplier 570. An adder 580 sums the outputs for the DFT-S-OFDM symbols conveying HARQ-ACK signals over each slot, and a demodulator and decoder 590 demodulates and decodes the summed HARQ-ACK signals over both subframe slots to obtain the transmitted HARQ-ACK information bits 595.

FIG. 6 illustrates a conventional structure for CSI signal transmission in a PUCCH subframe slot that includes CSI signals and RSs for enabling coherent demodulation of the CSI signals.

Referring to FIG. 6, after encoding, for example, using a block code, and modulation, for example, using QPSK (not shown for brevity), the CSI bits 610 modulate a CAZAC sequence 630, which is then transmitted after performing the IFFT operation as it is subsequently described. Each RS 640 is transmitted through the non-modulated CAZAC sequence.

FIG. 7 is a block diagram illustrating a UE transmitter structure for a CAZAC sequence. Specifically, FIG. 7 illustrates a UE transmitter structure for a CAZAC sequence 710 that can be used without modulation as an RS or with modulation as a CSI signal.

Referring to FIG. 7, the REs corresponding to the assigned PUCCH PRB are selected for mapping the CAZAC sequence 710 by sub-carrier mapper 730 under control of controller 720. IFFT is then performed by IFFT 740, and a cyclic shifter 750 applies a CS to the output of the IFFT 740. A CP inserter 760 adds a CP to the signal and the filter 770 for time windowing filters the signal, thereby generating transmitted signal 780.

FIG. 8 is a block diagram illustrating a NodeB receiver structure for a CAZAC sequence. Specifically, FIG. 8 illustrates a NodeB receiver block diagram for CSI signals that are transmitted using a modulated CAZAC sequence.

Referring to FIG. 8, an RF analog signal is received and converted into a digital received signal 810, which is filtered by filter 820 for time windowing. Thereafter, the CP is removed by CP remover 830. Subsequently, the CS is restored by cyclic shifter 840, and a FFT is applied by FFT 850. A sub-carrier demapper 860 selects transmitted REs, under control of controller 865, and the selected REs are then correlated with a replica 880 of the CAZAC sequence by multiplier 870, thereby generating output 890, which can then be passed to a channel estimation unit, such as a time-frequency interpolator, in case of a RS, or to detect the transmitted information, in case the CAZAC sequence is modulated by the CSI bits.

Although the PUCCH structures for transmission of HARQ-ACK or CSI signals were illustrated for the first subframe slot, they are respectively the same in the second subframe slot. An exception occurs in subframes, if any, supporting SRS transmission, where the last DFT-S-OFDM symbol in the second slot may be punctured as illustrated in FIG. 1. The PUCCH resource (PRB, CS) for CSI signal transmission is explicitly informed to the UE by the NodeB, while the PUCCH resource (PRB, CS, OCC) for the HARQ-ACK signal transmission may be either explicitly or implicitly informed.

If a UE is to transmit HARQ-ACK information and CSI in the PUCCH during the same subframe, the ability to do so depends on the number of HARQ-ACK bits. In case of 1 or 2 HARQ-ACK bits, the PUCCH structure for CSI transmission in FIG. 6 can be used and the HARQ-ACK bits can be conveyed by modulating the RS with an OCC that depends on the value of the HARQ-ACK bits.

Alternatively, the HARQ-ACK bits may be jointly encoded with the CSI bits.

However, these mechanisms are not feasible or practical in case of multiple HARQ-ACK bits.

For example, joint encoding of multiple HARQ-ACK bits and CSI bits may be problematic due to the different respective reliability requirements and due to the resulting worse detection reliability for both as the effective coding rate increases.

An alternative is for the UE to separately transmit in the same subframe HARQ-ACK signals and CSI signals. However, this is also associated with several drawbacks including an increase in the Cubic Metric (CM) of both transmissions and the need to apply Maximum Power Reduction (MPR) to satisfy spectral emission requirements. These shortcomings effectively prohibit the transmission of multiple HARQ-ACK bits and CSI bits in the PUCCH in the same subframe. Then, as HARQ-ACK is more important, CSI is not transmitted whenever it coincides with the transmission of multiple HARQ-ACK bits.

The HARQ-ACK multiplexing capacity per PUCCH PRB using the DFT-S-OFDM transmission structure is typically determined by the length of the OCC applied in the time domain, which in FIG. 3, is equal to 5, as the RS multiplexing capacity is determined by the number of CS providing orthogonal CAZAC sequences, which is typically larger than 5. If the last DFT-S-OFDM symbol in the second slot (for the structure illustrated in FIG. 3) is punctured in order to support SRS transmission, the HARQ-ACK multiplexing capacity is reduced from 5 to 4, as there will be 4 DFT-S-OFDM symbols available for HARQ-ACK signal transmission in the second slot and this determines the overall multiplexing capacity.

Therefore, there is a need to enable transmission of HARQ-ACK signals and CSI signals by a UE in the PUCCH during the same subframe, while avoiding the shortcomings associated with the conventional transmission method.

There is another need to determine conditions for the joint or separate coding and transmission of HARQ-ACK information bits and CSI information bits from a UE.

Finally, there is another need to maximize UE multiplexing capacity per PUCCH PRB for HARQ-ACK signal transmission, while also enabling SRS transmission by a UE.

SUMMARY OF THE INVENTION

Accordingly, the present invention has been designed to solve some the above-described limitations and problems in the prior art and provides methods and apparatus for a UE to multiplex control information in a PUSCH conveying data information over multiple codewords using a MIMO transmission principle.

In accordance with an aspect of the present invention, a method is provided for a User Equipment (UE) to simultaneously transmit information of a first type and information of a second type over a number of transmission symbols, the information of the first type and the information of the second type being respectively associated with a first Orthogonal Cover Code (OCC) and a second OCC, wherein a length of each OCC is equal to the number of transmission symbols. The method includes multiplying, at each transmission symbol, the information of the first type with a respective element of the first OCC to obtain a first output; multiplying, at each transmission symbol, the information of the second type with a respective element of the second OCC to obtain a second output; summing the first output and the second output to obtain a combined output; and transmitting the combined output.

In accordance with another aspect of the present invention, a method is provided for a UE to jointly transmit information bits of a first type and information bits of the second type or to only transmit information bits of the first type in a communication system. The method includes a base station signaling to a UE a first parameter when the UE is configured for communication over a single cell and signaling to the UE a second parameter when the UE is configured for communication over a multiple cells. The UE determines whether to jointly transmit information bits of the first type and information bits of the second type or whether to transmit only information bits of the first type according to the respective indication from the first parameter or from the second parameter.

In accordance with another aspect of the present invention, a method is provided for a UE to determine how to jointly transmit information bits of a first type and information bits of a second type in a communication system. The method includes a base station signaling to a UE a first parameter indicating whether the UE bundles information bits of the first type, or a second parameter indicating whether the UE transmits only a part of information bits of the second type, or both the first and the second parameters.

In accordance with another aspect of the present invention, a UE apparatus is provided for transmitting information of a first type and information of a second type over a number of transmission symbols, the information of the first type and the information of the second type being associated with a first Orthogonal Cover Code (OCC) and a second OCC, respectively, wherein a length of each OCC is equal to the number of transmission symbols. The UE apparatus includes a multiplier for multiplying, at each transmission symbol, the information of the first type with a respective element of the first OCC to obtain a first output; a multiplier for multiplying, at each transmission symbol, the information of the second type with a respective element of the second OCC to obtain a second output; a summer for summing, at each transmission symbol, the first output and the second output to obtain a combined output; and a transmitter for transmitting the combined output.

In accordance with another aspect of the present invention, a UE apparatus is provided for transmitting information bits of a first type and information bits of a second type or for transmitting only information bits of the first type. The UE apparatus includes a first transmitter structure for transmitting information bits of the first type and information bits of the second type or for transmitting only information bits of the first type in response to the reception of a first parameter when configured for communication in a single cell and a second transmitter structure for transmitting information bits of a first type and information bits of a second type or for transmitting only information bits of the first type in response to the reception of a second parameter when configured for communication in multiple cells.

In accordance with another aspect of the present invention, a UE apparatus is provided for transmitting information bits of a first type and information bits of a second type. The UE apparatus includes a bundler for bundling information bits of the first type if this is indicated by a first received parameter, or a selector for selecting only a part of the information bits of the second type if this is indicated by a second received parameter, or both a bundler and a selector; an encoder for jointly encoding the information bits of the first type from the bundling unit and the information bits of the second type from the selector; and a transmitter for transmitting encoded information bits.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF THE EMBODIMENTS OF THE INVENTION

Various embodiments of the present invention will now be described more fully with reference to the accompanying drawings. The present invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described with reference to DFT-spread OFDM transmission, it also applies to all FDM transmissions in general and to Single-Carrier FDMA (SC-FDMA) and OFDM in particular.

In accordance with an embodiment of the present invention, a UE transmits HARQ-ACK signals and CSI signals in the PUCCH in the same subframe while avoiding any CM and MPR issues. If the UE receives multiple TBs in multiple cells of a communication system, or in multiple DL subframes of a TDD system for which the HARQ-ACK transmission is in the same UL subframe, it conveys multiple HARQ-ACK bits corresponding to the correct, incorrect, or absent TB reception, using the previously described DFT-S-OFDM structure. The embodiment of the present invention considers that such a UE may also be configured to use the same DFT-S-OFDM structure for the CSI signal transmission. The transmission by a UE of a HARQ-ACK signal and a CSI signal can be in the same PRB by assigning a different OCC to each of the two signals. Consequently, the UE effectively transmits a single signal resulting from the superposition of the HARQ-ACK signal and the CSI signal. The same RS transmitted by the UE can be used for coherent demodulation of both HARQ-ACK and CSI signals, thereby offering additional performance gains as the RS power does not need to be distributed in different PRBs.

Figure 9:
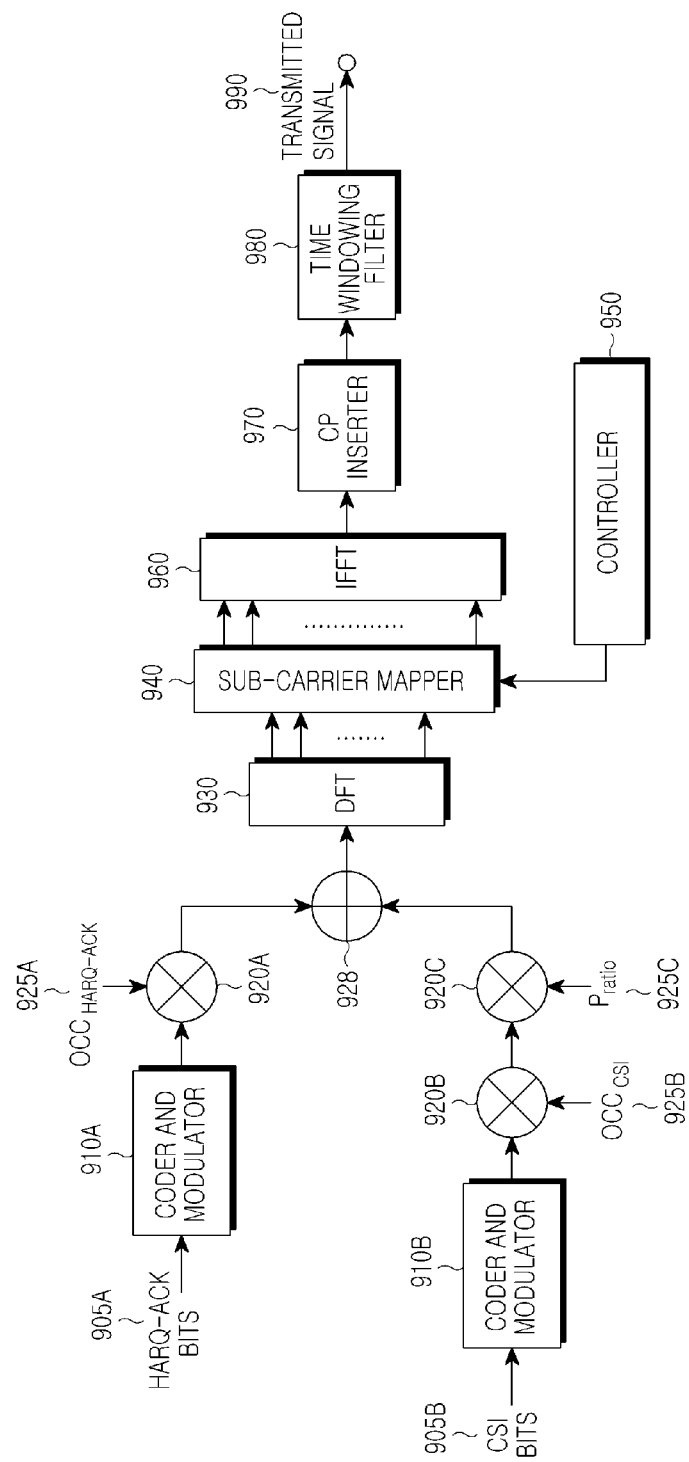
FIG. 9 is a block diagram illustrating a UE transmitter for HARQ-ACK signals and CSI signals transmitted in a same PRB, according to an embodiment of the present invention.

FIG. 9 is a block diagram illustrating a UE transmitter for a HARQ-ACK signal and a CSI signal transmitted in the same PRB, according to an embodiment of the present invention.

Referring to FIG. 9, the UE transmitter includes coder and modulator 910A and 910B, multipliers 920A, 920B, and 920C, combiner 928, DFT 930, sub-carrier mapper 940, controller 950, IFFT 960, CP inserter 970, and filter 980. HARQ-ACK information bits 905A are encoded and modulated by coder and modulator 910A and then multiplied by multiplier 920A with an element of the OCC assigned to the HARQ-ACK for the respective DFT-S-OFDM symbol, $OCC_{HARQ-ACK}$ 925A. In a similar manner, CSI information bits 905B are encoded and modulated by coder and modulator 910B and then multiplied by multiplier 920B with an element of the OCC assigned to the CSI for the respective DFT-S-OFDM symbol, $OCC_{CSI}$ 925B. Assuming that the transmission power corresponding to the HARQ-ACK signal is applied to the combined HARQ and CSI signal, the encoded and modulated CSI bits are also scaled by multiplier 920C by the relative ratio $P_{ratio}$ 925C of the CSI signal transmission power over the HARQ-ACK signal transmission power. The outputs of multipliers 920A and 920C are combined by combiner 928. DFT precoding is then performed on the combined signal by DFT 930.

After DFT precoding, the REs of an assigned PUCCH PRB are selected by sub-carrier mapper 940 under the control of controller 950. IFFT is performed by IFFT 960 and a CP is inserted by CP inserter 970. Thereafter, the CP inserted signal is filtered by filter 980, thereby generating transmitted signal 990.

Figure 10:
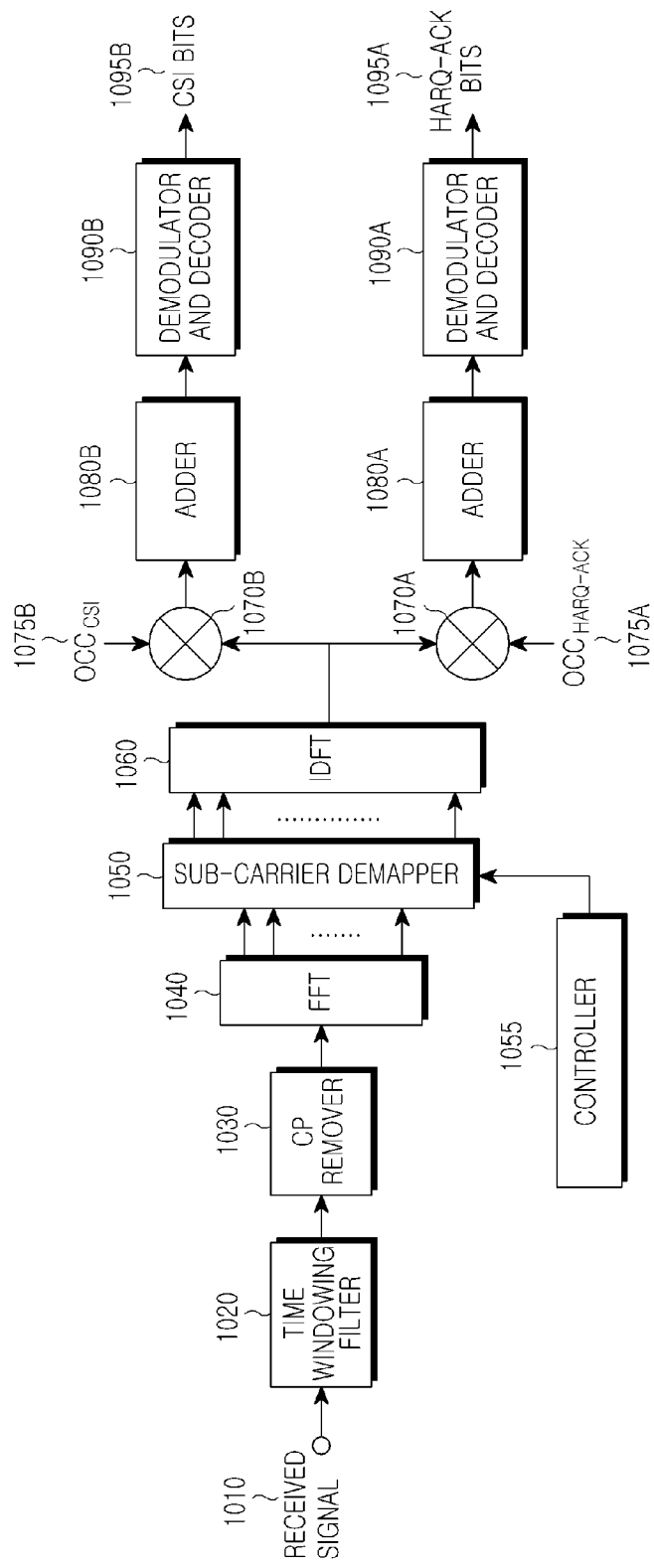
FIG. 10 is a block diagram illustrating a NodeB receiver for HARQ-ACK signals and CSI signals transmitted in a same PRB, according to an embodiment of the present invention.

FIG. 10 illustrates a NodeB receiver block diagram for a HARQ-ACK signal and a CSI signal transmitted in a same PRB, according to an embodiment of the present invention.

Referring to FIG. 10, the receiver includes a filter 1020, a CP remover 1030, FFT 1040, sub-carrier demapper 1050, controller 1055, IDFT 1060, multipliers 1070A and 1070B, adders 1080A and 1080B, and demodulator and decoder 1090A and 1090B. The receiver receives an RF analog signal and converts it into digital signal 1010, which is filtered by filter 1020. Thereafter, a CP is removed by CP remover 1030. Subsequently, the NodeB receiver applies FFT by FFT 1040, sub-carrier demapper 1050 selects REs used by the UE transmitter by performing sub-carrier demapping under control of the controller 1055, and IDFT 1060 applies IDFT. For the detection of the HARQ-ACK bits, the output of the IDFT is multiplied by multiplier 1070A by an element of an OCC assigned to the HARQ-ACK for the respective DFT-S-OFDM symbol, i.e., $OCC_{HARQ-ACK}$ 1075A, and the result is summed over each slot by adder 1080A. Demodulation and decoding are then performed by demodulator and decoder 1090A to provide the HARQ-ACK information bits. In a similar manner, for the detection of the CSI bits, the output of the IDFT is multiplied by multiplier 1070B by the element of the OCC assigned to the CSI for the respective DFT-S-OFDM symbol, i.e., $OCC_{CSI}$ 1075B, and the result is summed over each slot by adder 1080B. Finally, demodulation and decoding are performed by demodulator and decoder 1090B to provide the CSI information bits.

The UE transmitter in FIG. 9 and the NodeB receiver in FIG. 10 share the same DFT/IFFT/filtering process and the same IDFT/FFT/filtering process, respectively, for both the HARQ-ACK and the CSI signal as the combined signal is transmitted and received. This reduction in complexity is enabled by transmitting the HARQ-ACK and CSI signals in the same PRB. Further, a single transmitter structure is used for an RS, which could be shared for the demodulation of the HARQ-ACK and CSI signals, if they are transmitted in the same PUCCH PRB. Separate transmitter and receiver processing chains would generally be used if the HARQ-ACK signal and the CSI signal are transmitted in different PRBs.

The OCC for the HARQ-ACK signal transmission may be dynamically indicated to the UE by the NodeB from a set of predetermined OCCs, which is informed to the UE by the NodeB through higher layer signaling such as Radio Resource Control (RRC) signaling. For example, the DCI format scheduling the PDSCH in response to which the UE transmits the HARQ-ACK may include a field indicating at least which OCC, from the predetermined set of OCCs, the UE should use for the HARQ-ACK signal transmission. Each OCC in the set of predetermined OCCs may also be associated with a PRB, in which case, the dynamic OCC indication also includes the PRB indication. If the same PRB is indicated for the HARQ-ACK signal transmission as the predetermined PRB for the CSI signal transmission, the UE may transmit both the HARQ-ACK signal and the CSI signal as illustrated in FIG. 9; otherwise, the UE may transmit only the HARQ-ACK signal and not transmit the CSI signal.

With the above described transmitter and receiver, simultaneous transmissions of HARQ-ACK and CSI signals from a UE may be conditioned on whether the PRB the NodeB indicates to the UE for HARQ-ACK signal transmission is the same as the one the NodeB assigns to the UE for CSI signal transmission. For a reference UE, the NodeB may associate one or more OCCs in the predetermined set of OCCs for HARQ-ACK signal transmission with the same PRB as for the CSI signal transmission and associate the remaining OCCs with a different PRB than the one for the CSI signal transmission. In this manner, as multiple UEs may be assigned the same PRB for respective transmissions of CSI signals in the same subframe, the NodeB may dynamically select whether to multiplex the HARQ-ACK signal transmission from a UE in that PRB, depending on the respective OCC availability (multiple UEs may share the same OCC for HARQ-ACK signal transmission in the PRB assigned to transmissions of their CSI signals).

In accordance with another embodiment of the invention, when using the same PUCCH structure to transmit a HARQ-ACK signal and a CSI signal, joint encoding of the respective information bits may be desirable only when the combined payload is smaller than or equal to a predetermined value. For example, it may not be desirable to jointly code the HARQ-ACK and CSI information bits when the resulting combined payload results to a substantial reduction in the effective coding rate for the jointly encoded HARQ-ACK and CSI information bits.

As each of the number of HARQ-ACK information bits and the number of CSI information bits is predetermined, the NodeB knows their total value (total HARQ-ACK and CSI payload). Accordingly, when the transmission of HARQ-ACK and CSI is to occur in the same subframe, the NodeB can determine whether or not it is preferable for a UE to jointly encode and transmit the HARQ-ACK and CSI or to drop the CSI information and transmit only the HARQ-ACK. The NodeB can therefore configure a UE either to jointly transmit the HARQ-ACK and CSI or to only transmit the HARQ-ACK and not transmit the CSI.

Figure 6:
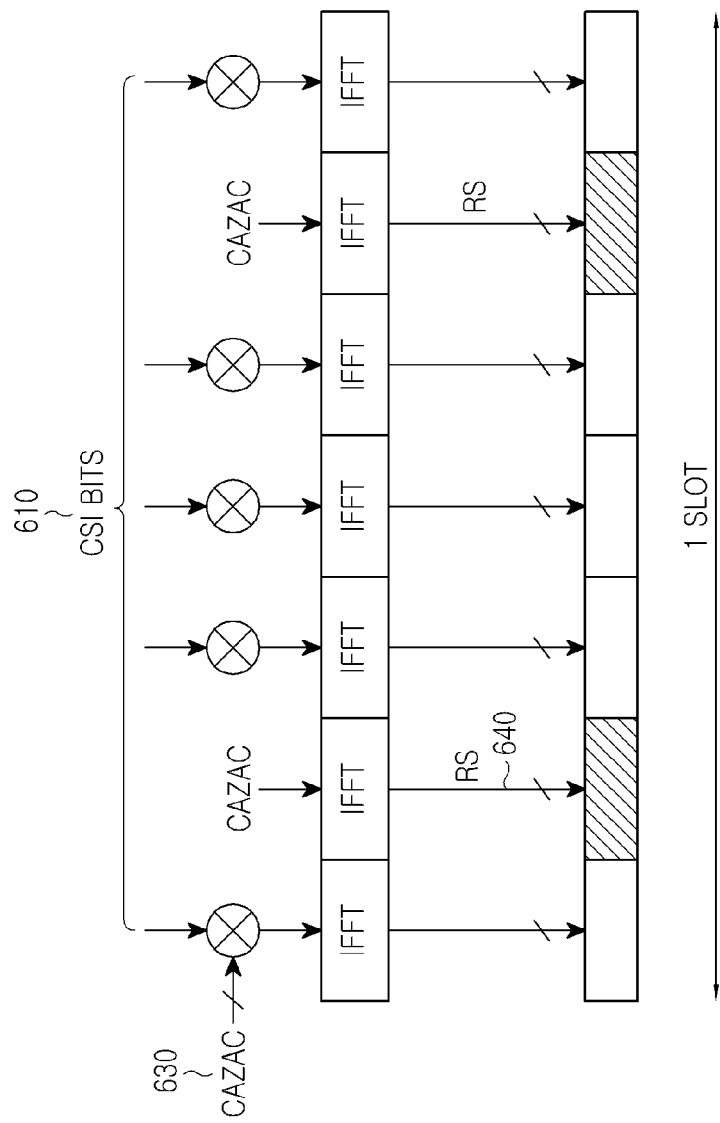
FIG. 6 is a diagram illustrating a conventional structure for CSI signal transmission in a PUCCH subframe slot.
Figure 7:
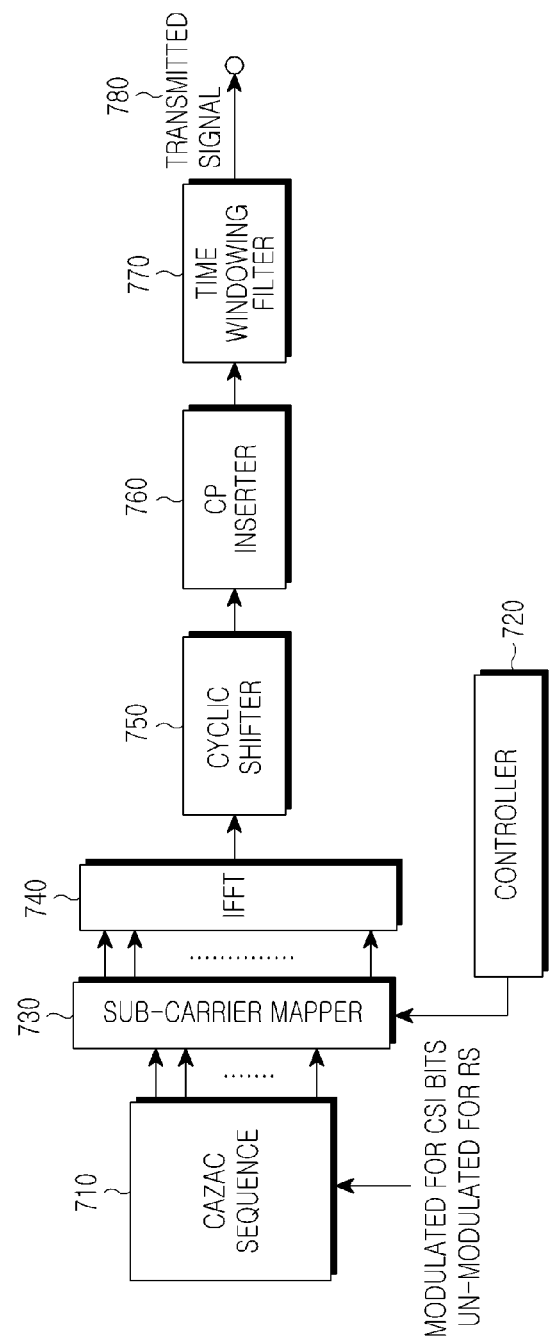
FIG. 7 is a block diagram illustrating a conventional UE transmitter structure for a CAZAC sequence.
Figure 8:
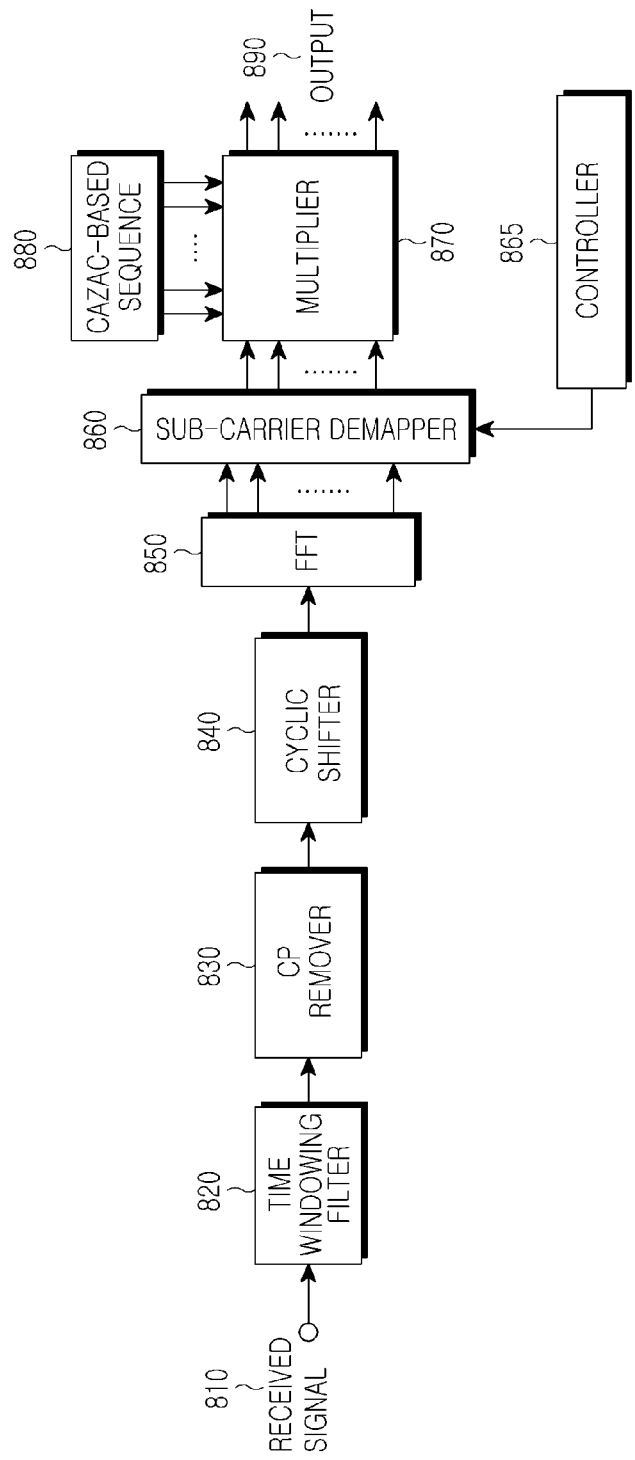
FIG. 8 is a block diagram illustrating a conventional NodeB receiver structure for a CAZAC sequence.

The NodeB separately configures a UE whether to jointly transmit HARQ-ACK and CSI depending on whether the UE is configured PDSCH receptions over multiple cells or over a single cell by signaling to the UE two respective parameters, for example using RRC signaling. If a UE is configured PDSCH receptions over multiple cells, the structure illustrated in FIG. 2 can be used for the joint transmission of HARQ-ACK and CSI and the NodeB signals to the UE the parameter simultaneousAckNackAndCQI_CA. If simultaneousAckNackAndCQI_CA=TRUE, the UE jointly transmits HARQ-ACK and CSI; otherwise, the UE only transmits HARQ-ACK. If a UE is configured PDSCH receptions over single cell, the structure in FIG. 6 can be used for the joint transmission of HARQ-ACK and CSI and the NodeB signals to a UE the parameter simultaneousAckNackAndCQI. If simultaneousAckNackAndCQI=TRUE, the UE jointly transmits HARQ-ACK and CSI; otherwise, the UE only transmits HARQ-ACK.

Figure 11:
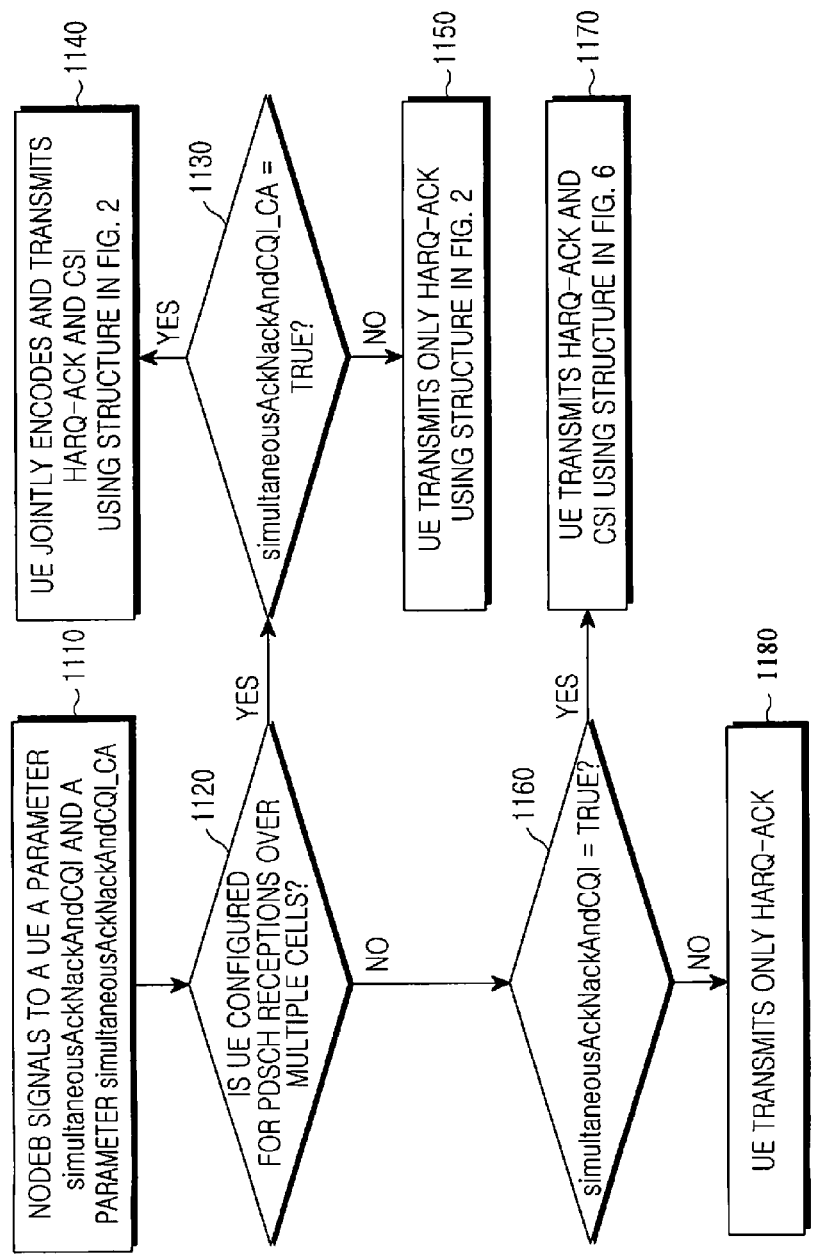
FIG. 11 is a flowchart illustrating a method for determining whether the HARQ-ACK bits and CSI bits are jointly encoded and transmitted using one PUCCH resource or whether only HARQ-ACK bits are transmitted, according to an embodiment of the present invention.

FIG. 11 illustrates a method for determining whether HARQ-ACK information bits and CSI information bits are jointly transmitted or whether only the HARQ-ACK information bits are transmitted, according to an embodiment of the present invention.

Referring to FIG. 11, in step 1110, the NodeB signals to a UE the parameter simultaneousAckNackAndCQI and the parameter simultaneousAckNackAndCQI_CA. If the UE is configured for PDSCH receptions over multiple cells in step 1120, it examines if the parameter simultaneousAckNackAndCQI_CA is set to TRUE in step 1130. If it is, the UE jointly transmits HARQ-ACK and CSI using the structure illustrated in FIG. 2, in step 1140. If it is not, the UE transmits only HARQ-ACK using the structure illustrated in FIG. 2, in step 1150. If the UE is configured for PDSCH receptions over a single cell, it examines if the parameter simultaneousAck-NackAndCQI is set to TRUE in step 1160. If it is, the UE jointly transmits HARQ-ACK and CSI using the structure illustrated in FIG. 6, in step 1170. If it is not, the UE transmits only HARQ-ACK using the structure illustrated in FIG. 6, in step 1180.

Figure 1:
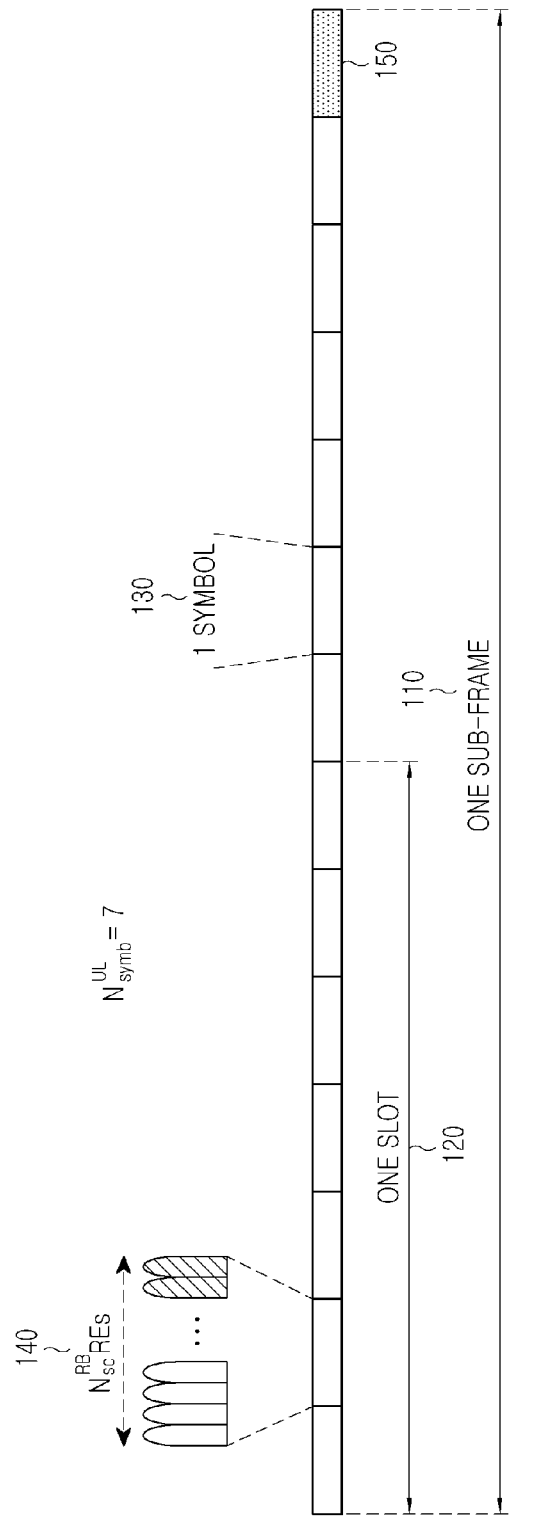
FIG. 1 is a diagram illustrating a conventional PUCCH subframe structure.
Figure 2:
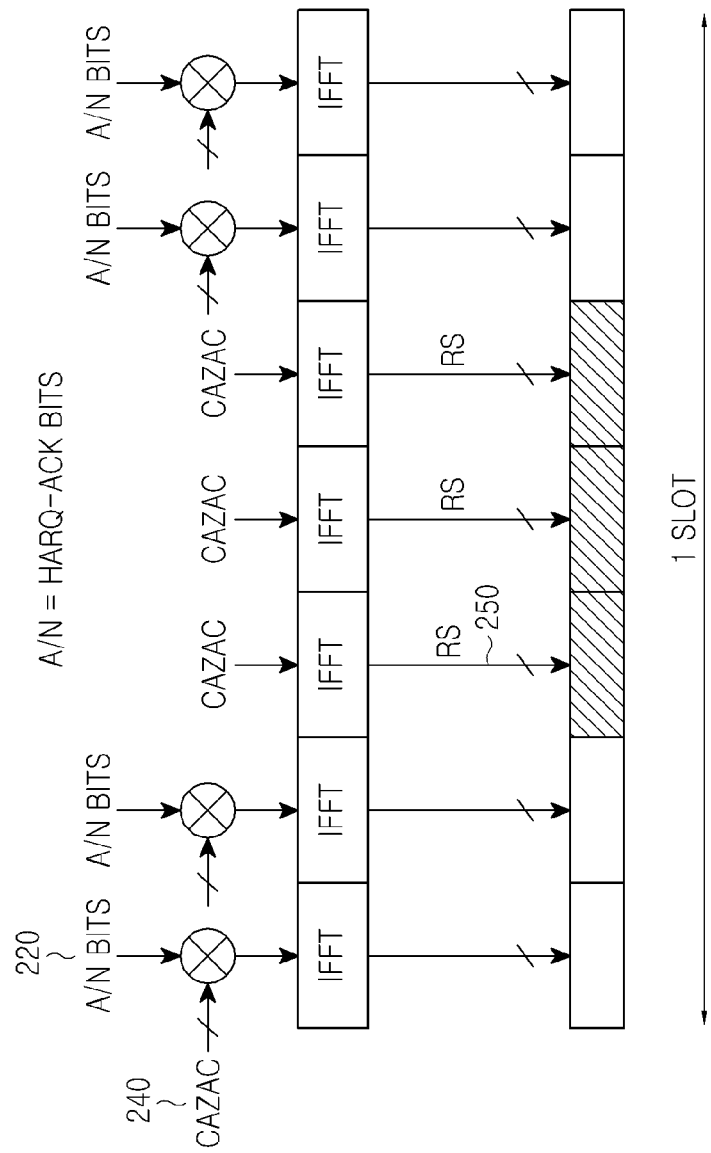
FIG. 2 is a diagram illustrating a conventional PUCCH structure in one subframe slot for HARQ-ACK signal transmission consisting of 1 or 2 HARQ-ACK bits.

To facilitate joint transmission of HARQ-ACK and CSI using the structure illustrated in FIG. 2, the NodeB may also configure a UE to reduce the combined HARQ-ACK and CSI payload when HARQ-ACK and CSI is to be transmitted in the same subframe. For example, the NodeB may signal to a UE a parameter simultaneousAckNackAndCQI_Bundling, a parameter simultaneousAckNackAndCQI_PartialCSI, or both. If the parameter simultaneousAckNackAndCQI_Bundling is set to TRUE, the UE performs HARQ-ACK spatial domain bundling when jointly transmitting HARQ-ACK and CSI. If the parameter simultaneousAckNackAnd-CQI_PartialCSI is set to TRUE, the UE transmits, for example, only wideband CQI and drops the transmission of narrowband CQI when jointly transmitting HARQ-ACK and CSI.

Figure 12:
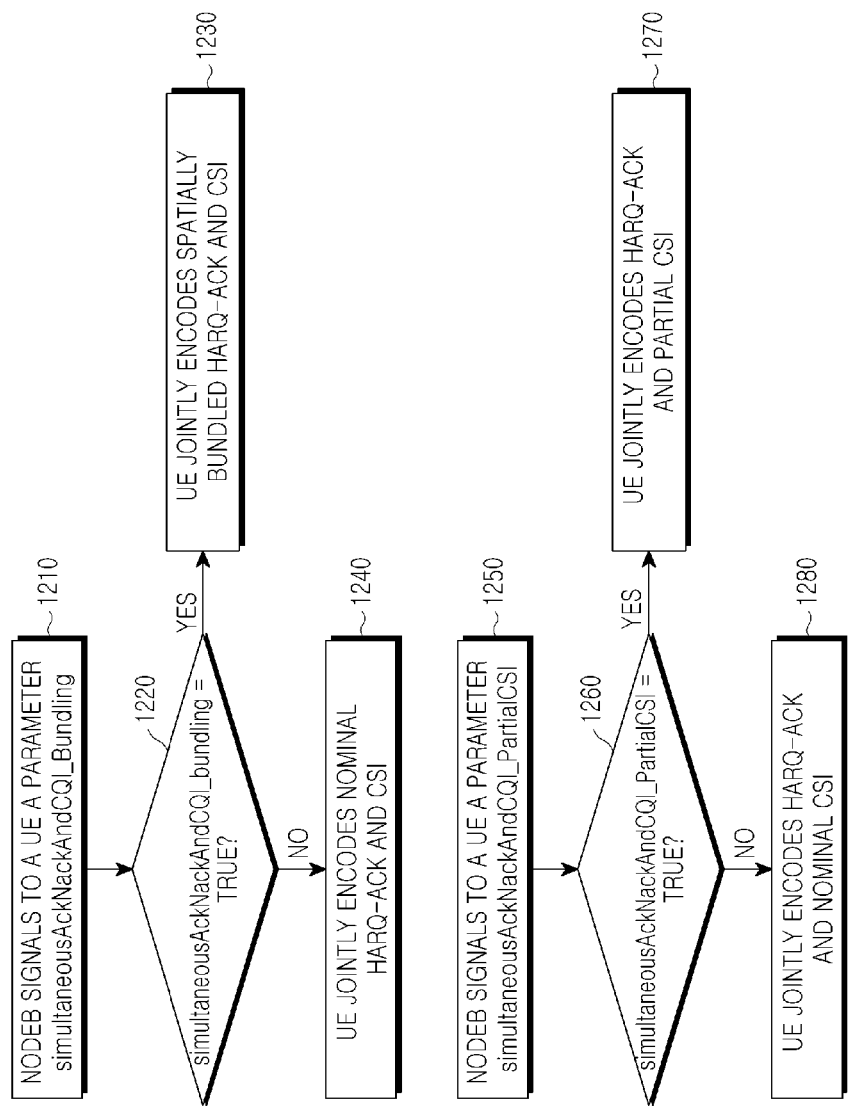
FIG. 12 is a flowchart illustrating a method for determining whether to apply spatial domain bundling to the HARQ-ACK bits or whether to transmit only a part of the CSI bits, or both, when the HARQ-ACK and CSI are jointly encoded and transmitted using one PUCCH resource, according to an embodiment of the present invention.

FIG. 12 illustrates a method for determining whether to apply HARQ-ACK spatial domain bundling, or whether to transmit partial CSI, or both when HARQ-ACK and CSI are jointly encoded and transmitted using one PUCCH resource as illustrated in FIG. 2, according to an embodiment of the present invention.

Referring to FIG. 12, in step 1210, the NodeB signals to a UE a parameter simultaneousAckNackAndCQI_Bundling which if set to TRUE in step 1220, the UE applies HARQ-ACK spatial domain bundling before jointly transmitting HARQ-ACK and CSI in step 1230, and if set to FALSE in step 1220, the UE jointly transmits the nominal HARQ-ACK (without spatial domain bundling) and CSI in step 1240. The NodeB may also signal to a UE a parameter simultaneousAckNackAndCQI_PartialCSI in step 1250, which if set to TRUE in step 1260, the UE jointly transmits HARQ-ACK and only partial CSI, for example only wideband CQI, in step 1270, and if set to FALSE, the UE jointly transmits the nominal CSI and HARQ-ACK in step 1280.

As the PUCCH resource (OCC and PRB) used for the CSI signal transmission is assumed to be predetermined and assigned to the UE through higher layer signaling while the PUCCH resource (OCC and PRB) used for the HARQ-ACK signal transmission is assumed to be dynamically indicated, possibly from a set of predetermined resources, it is preferable to use the PUCCH resource allocated to the CSI signal transmission for the joint transmission of the HARQ-ACK and CSI information, in order to reduce the PUCCH overhead as the potential PUCCH resource for the HARQ-ACK signal transmission may be allocated to another UE. This may not always be possible for the PUCCH resource used for the CSI signal transmission.

Figure 13:
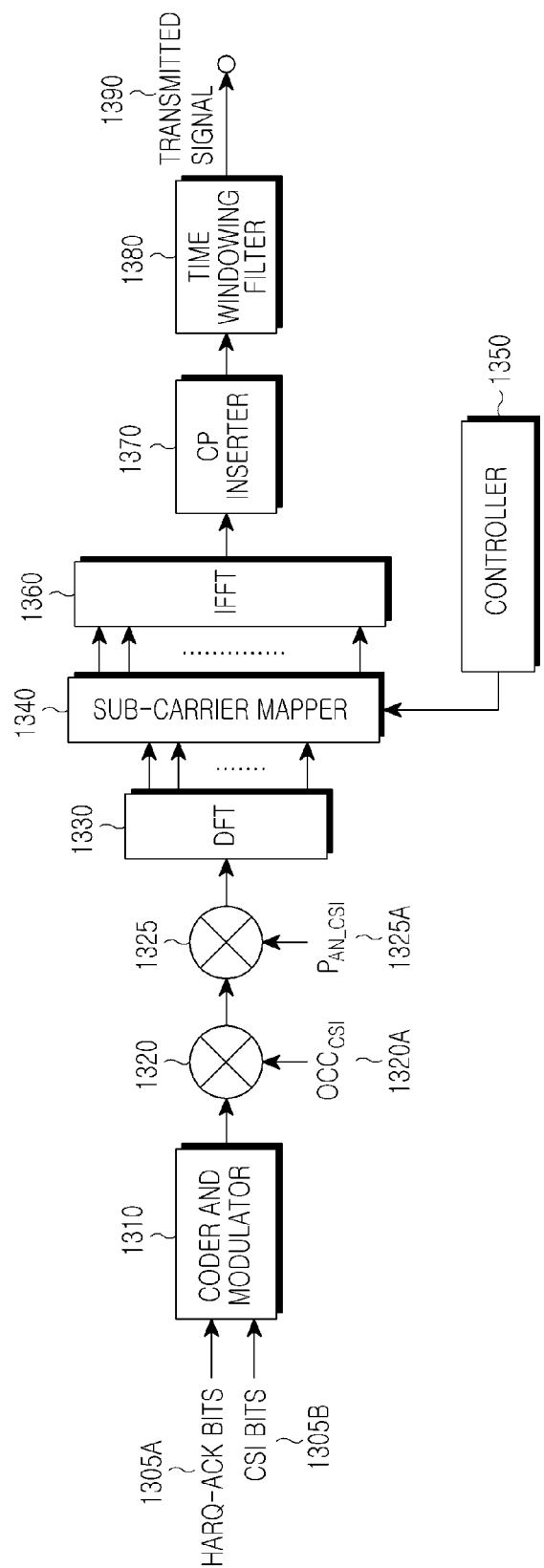
FIG. 13 is a block diagram illustrating a UE transmitter for jointly encoded HARQ-ACK bits and CSI bits transmitted in a PUCCH resource assigned to a UE for CSI transmission, according to an embodiment of the present invention.

FIG. 13 is a block diagram illustrating a UE transmitter for joint encoding and transmission of HARQ-ACK information bits and CSI information bits in a PUCCH resource assigned to a UE from a NodeB for CSI signal transmission (instead of HARQ-ACK signal transmission), according to an embodiment of the present invention.

Referring to FIG. 13, the transmitter includes coder and modulator 1310, multipliers 1320 and 1325, DFT 1325, sub-carrier mapper 1340, controller 1350, IFFT 1360, CP inserter 1370, and filter 1380. HARQ-ACK information bits 1305A and CSI information bits 1305B are jointly encoded and modulated by coder and modulator 1310 and then multiplied by multiplier 1320 with an element of the $OCC_{CSI}$ 1325A, which is assigned to CSI signaling in the respective DFT-S-OFDM symbol. For the joint transmission of HARQ-ACK and CSI, the HARQ-ACK information bits may be obtained after spatial domain bundling and the CSI information bits may correspond to a subset of the original CSI information bits. The transmission power is adjusted by multiplier 1325 to reflect the joint encoding of the HARQ-ACK information bits and CSI information bits 1325A. DFT precoding is then performed by DFT 930 on the output of multiplier 1325.

After DFT precoding, the REs of an assigned PUCCH PRB are selected by sub-carrier mapper 1340 under the control of controller 1350. IFFT is performed by IFFT 1360 and a CP is inserted by CP inserter 1370. Thereafter, the CP inserted signal is filtered by filter 1380, thereby generating transmitted signal 1390.

Figure 14:
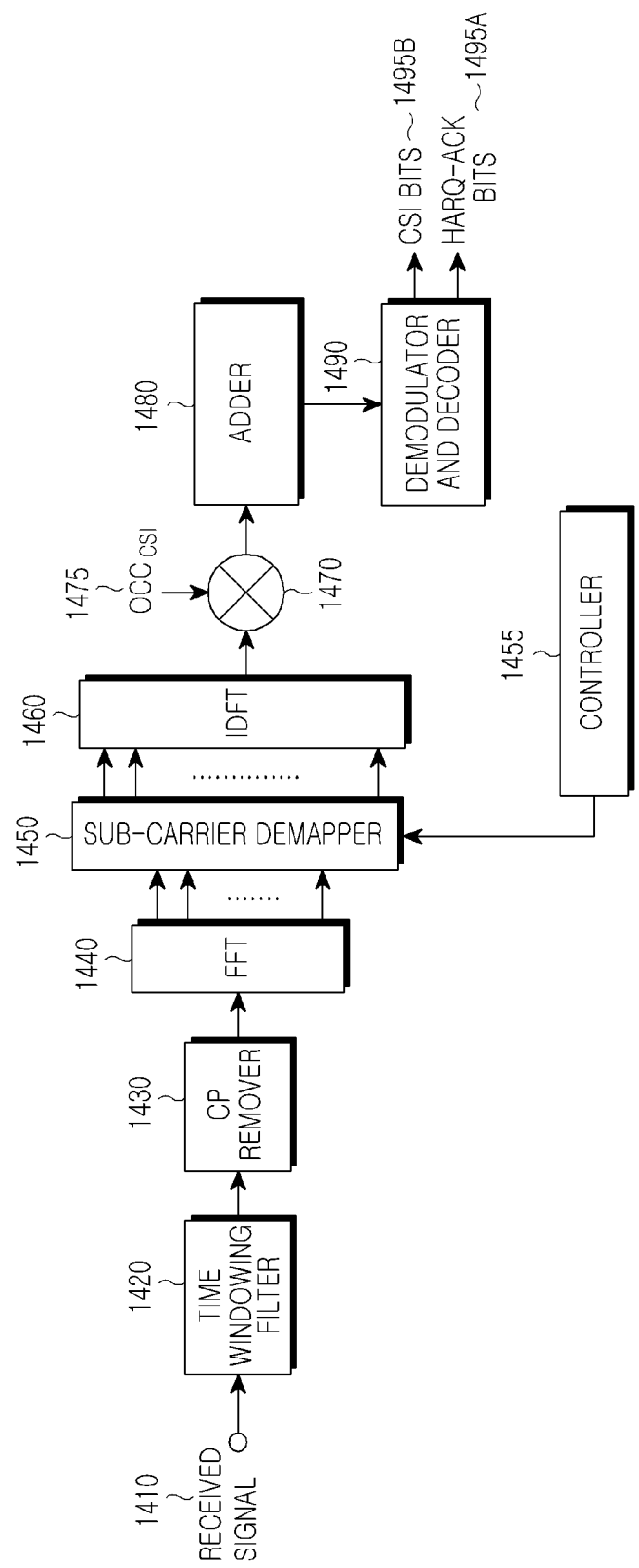
FIG. 14 is a block diagram illustrating a NodeB receiver for jointly encoded HARQ-ACK bits and CSI bits transmitted in a PUCCH resource assigned to a UE for CSI transmission, according to an embodiment of the present invention.

FIG. 14 is a block diagram illustrating a NodeB receiver for detection of jointly encoded and transmitted HARQ-ACK information bits and CSI information bits in PUCCH resource assigned to a UE from a NodeB for CSI transmission according to an embodiment of the present invention.

Referring to FIG. 14, the receiver includes a filter 1420, a CP remover 1430, FFT 1440, sub-carrier demapper 1450, controller 1455, IDFT 1460, multiplier 1470, adder 1480, and demodulator and decoder 1490. The receiver receives an RF analog signal and converts it into digital signal 1410, which is filtered by filter 1420. Thereafter, a CP is removed by CP remover 1430. Subsequently, the NodeB receiver applies FFT by FFT 1440, sub-carrier demapper 1450 under control of the controller 1455 selects REs used by the UE transmitter and IDFT 1460 applies IDFT. For joint detection of the HARQ-ACK bits and CSI bits, the output of the IDFT 1460 is multiplied by multiplier 1470 by the element of the OCC assigned to the CSI $OCC_{CSI}$ 1475 for the respective DFT-S-OFDM symbol and the result is summed over each slot by adder 1480. Finally, demodulation and decoding are performed by demodulator and decoder 1490 to provide the HARQ-ACK information bits 1495A and the CSI information bits 1495B.

Figure 3:
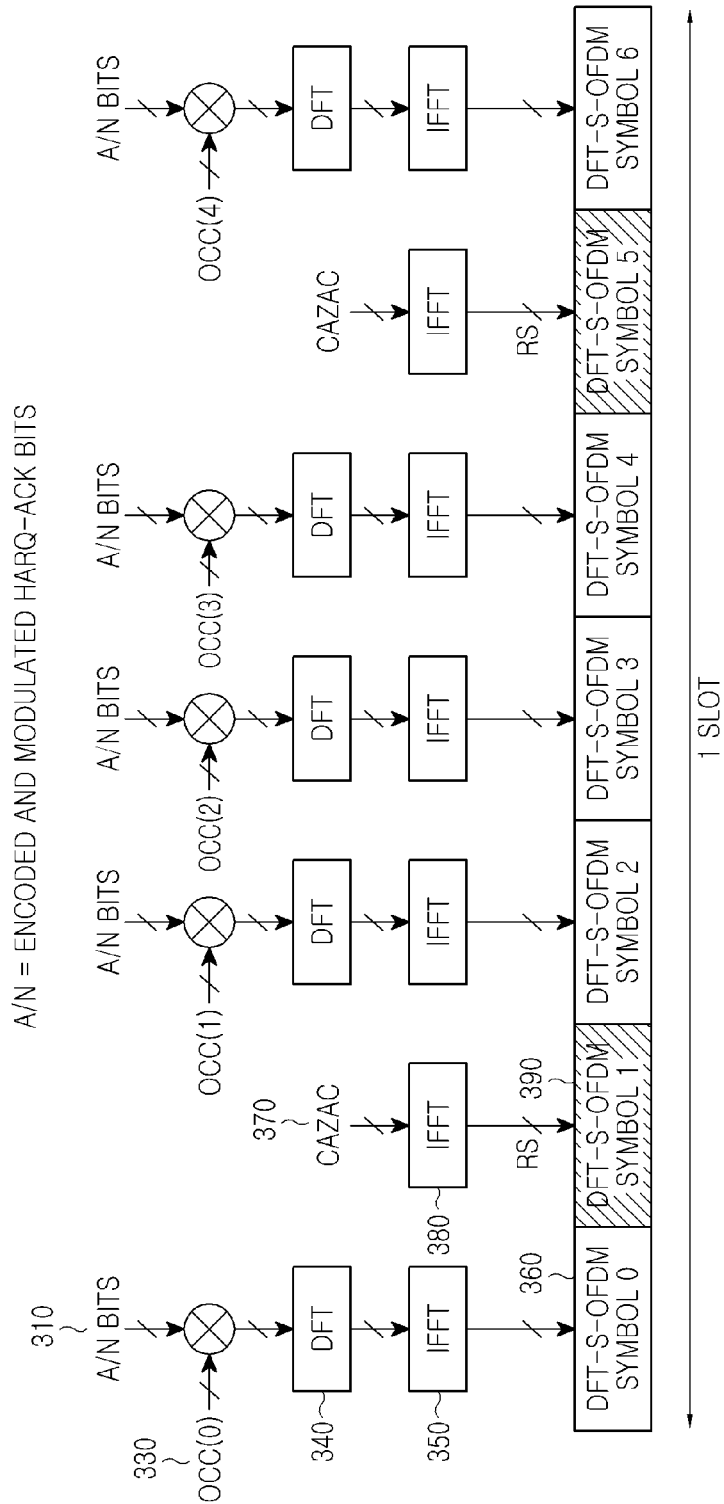
FIG. 3 is a diagram illustrating a conventional PUCCH structure in one subframe slot for multi-bit HARQ-ACK signal transmission based on the DFT-S-OFDM principle.
Figure 4:
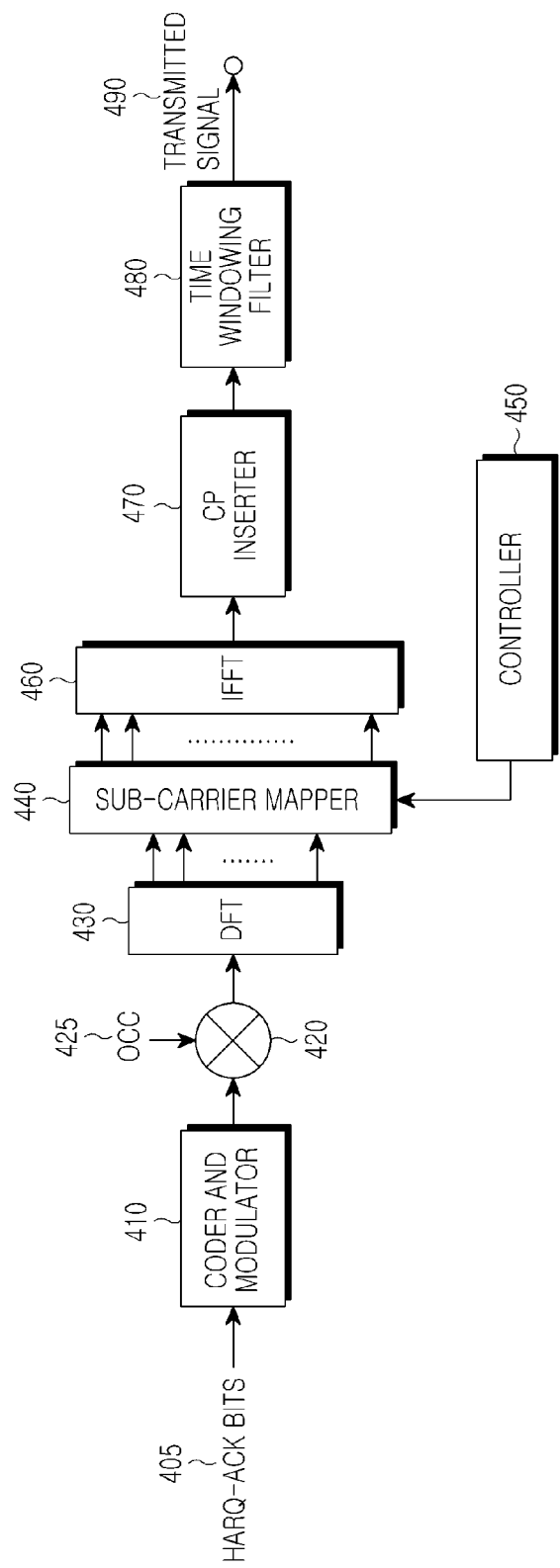
FIG. 4 is a block diagram illustrating a conventional UE transmitter for HARQ-ACK signals.
Figure 5:
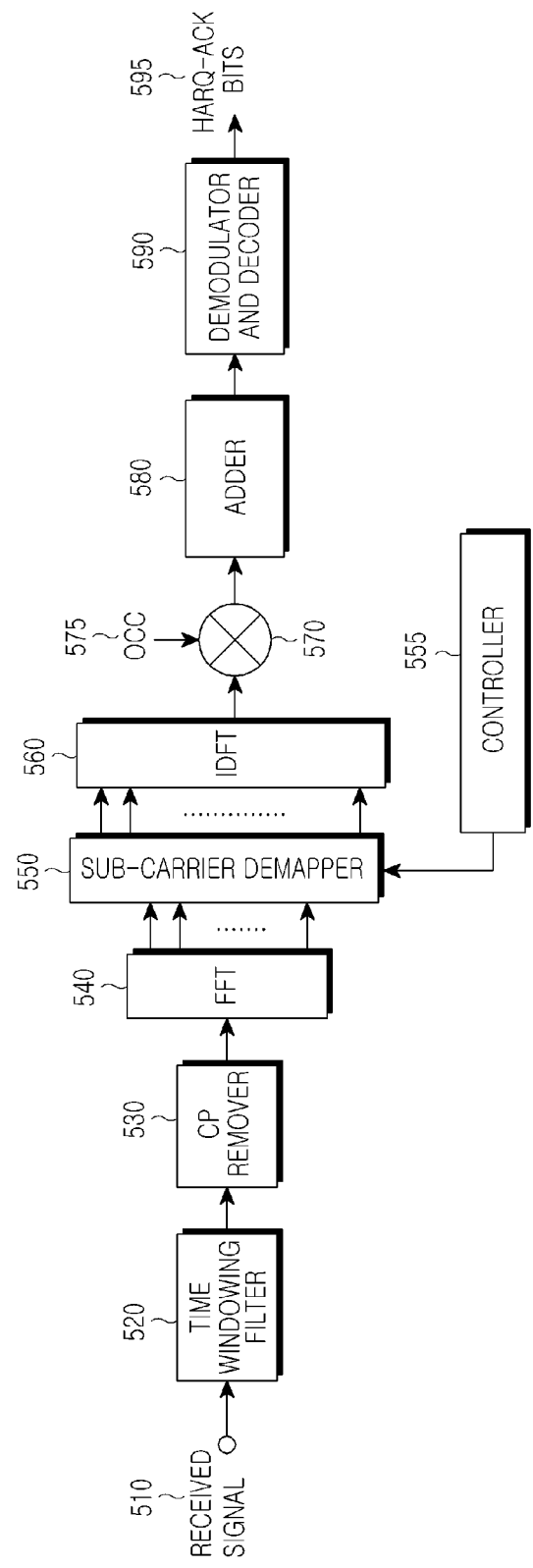
FIG. 5 is a block diagram illustrating a conventional NodeB receiver for HARQ-ACK signals.

In accordance with another embodiment of the present invention, the partitioning of the DFT-S-OFDM symbols for the transmission of HARQ-ACK signals and RS, and their respective placement in the PUCCH subframe, are considered. Assuming that the PUCCH transmission in each slot occurs at different parts of the operating BW and that the number of CSs for orthogonal (CAZAC sequence based) RS multiplexing among UEs is at least 6, the multiplexing capacity per PRB is determined from the length of the OCC applied to the transmission of HARQ-ACK signals. In FIG. 3, the OCC length is 5, thereby allowing orthogonal multiplexing of HARQ-ACK signals from 5 UEs per PRB.

Assuming that a UE does not drop its SRS transmission when transmitting HARQ-ACK in the PUCCH in the same subframe and that concurrent transmission of SRS and HARQ-ACK signals is not possible due to spectral emissions considerations, a UE punctures/suspends transmission in the last PUCCH symbol in order to transmit the SRS. Then, for the structure in FIG. 3, the UE cannot transmit the HARQ-ACK signal in the last DFT-S-OFDM symbol of the PUCCH subframe. In order to maintain orthogonal multiplexing of HARQ-ACK signal transmissions, each UE suspends the respective HARQ-ACK signal transmission in the last PUCCH symbol regardless of whether it transmits an SRS. Therefore, 4 DFT-S-OFDM symbols are available for HARQ-ACK signal transmission and the resulting multiplexing capacity is reduced from 5 to 4 (the respective OCC can be the length 4 Walsh-Hadamard code).

Figure 15:
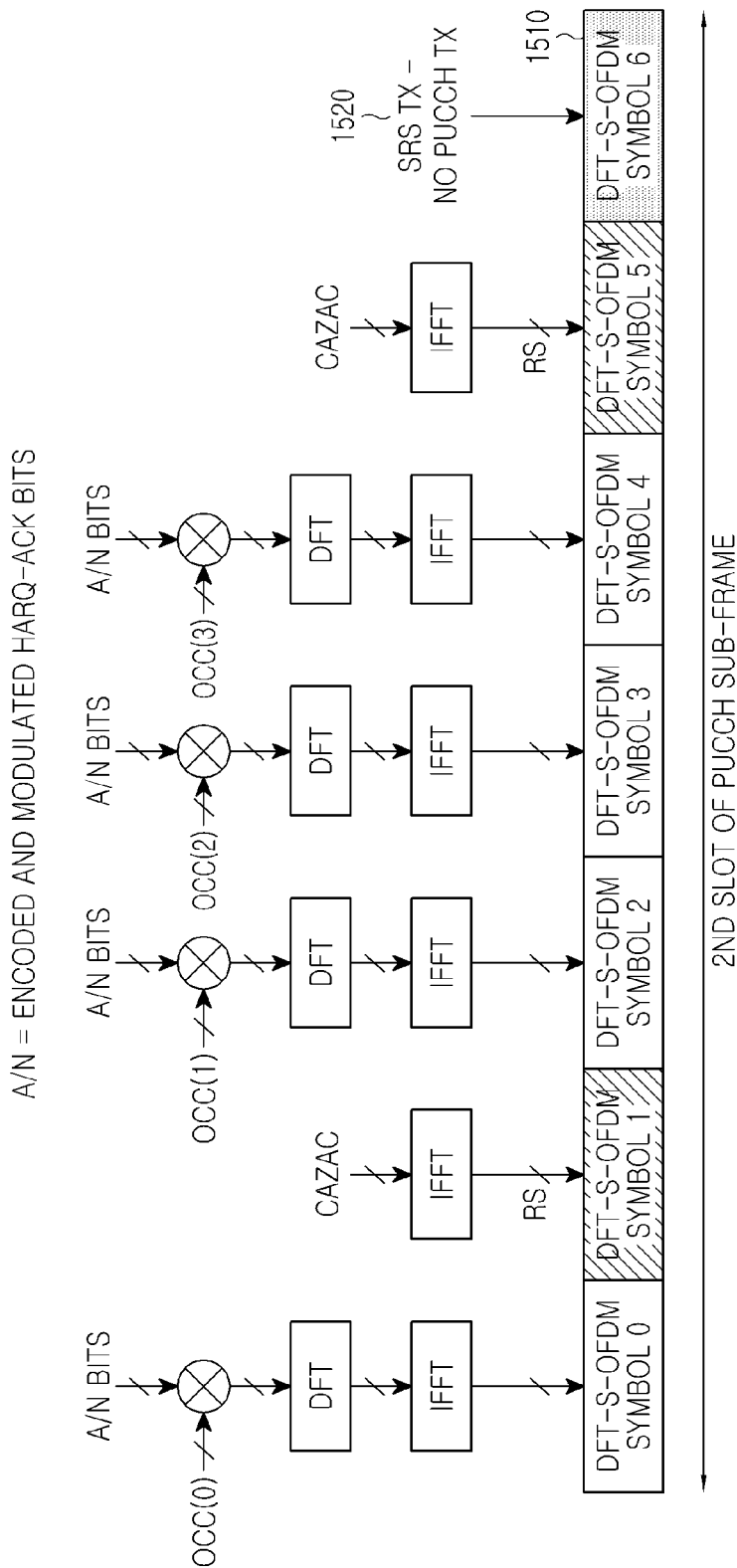
FIG. 15 is a diagram illustrating puncturing of HARQ-ACK signal transmission in a last DFT-S-OFDM symbol of a PUCCH subframe in order to transmit an SRS, according to an embodiment of the present invention.

FIG. 15 illustrates puncturing of a HARQ-ACK signal transmission in a last DFT-S-OFDM symbol of a PUCCH subframe in order for a UE to transmit an SRS, according to an embodiment of the present invention.

Referring to FIG. 15, in the second slot of the PUCCH subframe, HARQ-ACK signal transmission in the last DFT-S-OFDM symbol 1510 is suspended and SRS transmission 1520 occurs. The OCC is modified to a length-4 one and can be one of the Walsh-Hadamard codes $\{1, 1, 1, 1\}$, or $\{1, -1, 1, -1\}$, or $\{1, 1, -1, -1\}$, or $\{1, -1, -1, 1\}$.

To avoid reducing the PUCCH multiplexing capacity for HARQ-ACK signal transmission using the DFT-S-OFDM structure, the present invention considers that the RS in the second slot is placed at the last DFT-S-OFDM symbol. Then, SRS transmission does not affect the number of DFT-S-OFDM symbols used for HARQ-ACK signal transmission, which remain the same in both slots of the PUCCH subframe.

Figure 16:
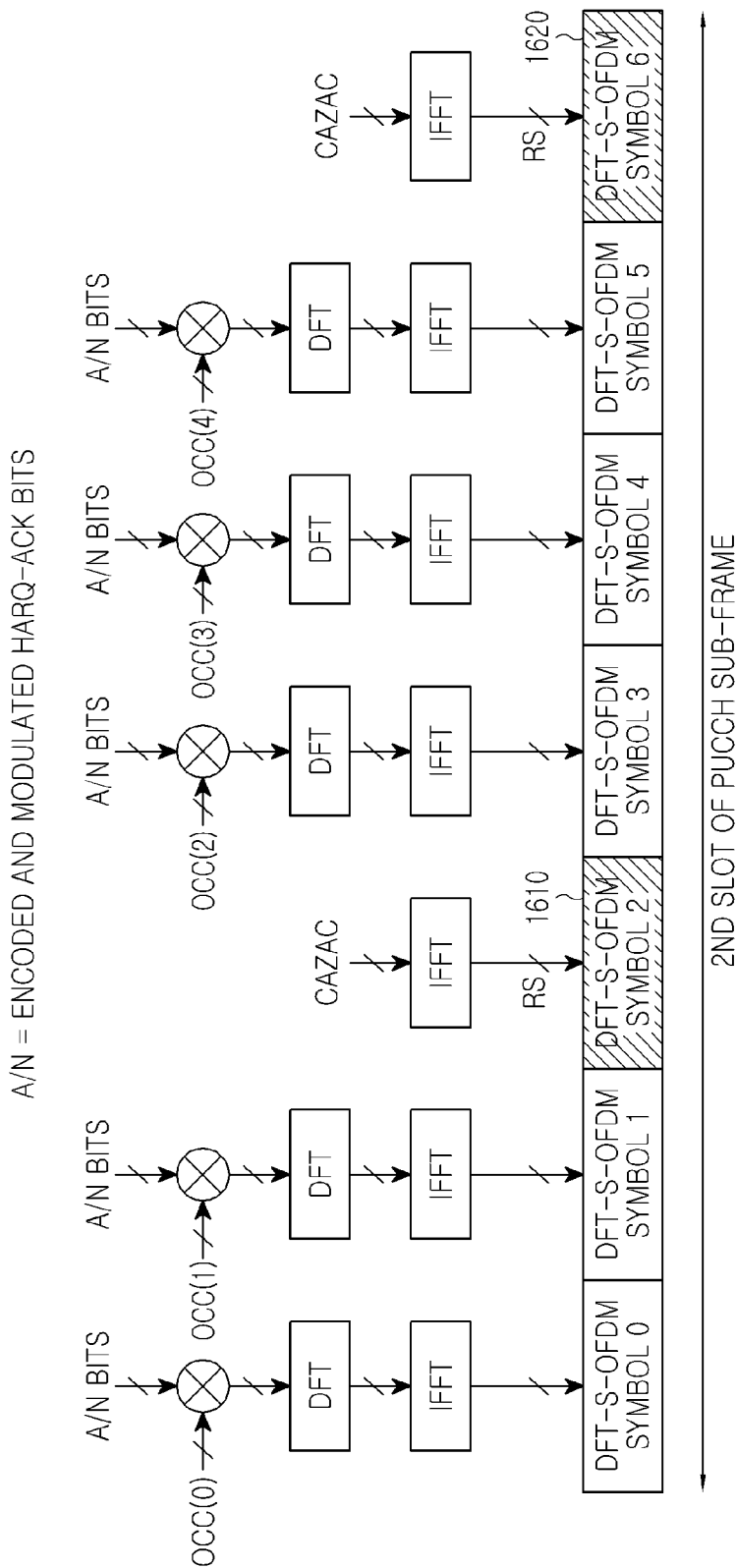
FIG. 16 is a diagram illustrating puncturing of RS transmission in a last DFT-S-OFDM symbol of a PUCCH subframe in order to transmit an SRS, according to an embodiment of the present invention.

FIG. 16 illustrates placement of DFT-S-OFDM symbols for HARQ-ACK signals and an RS in a second slot of a PUCCH subframe, according to an embodiment of the present invention. Specifically, in FIG. 16, the number of DFT-S-OFDM symbols used for the transmission of HARQ-ACK signals or the RS is the same in both slots, but their placement may vary in each of the two slots. Moreover, the exact placement of the DFT-S-OFDM symbol allocated to the first RS transmission 1610 is not material and a different DFT-S-OFDM symbol can be selected. However, the placement of the DFT-S-OFDM symbol allocated to the second RS transmission in the second slot 1620 is constrained to be at the last DFT-S-OFDM symbol of the PUCCH subframe.

Figure 17:
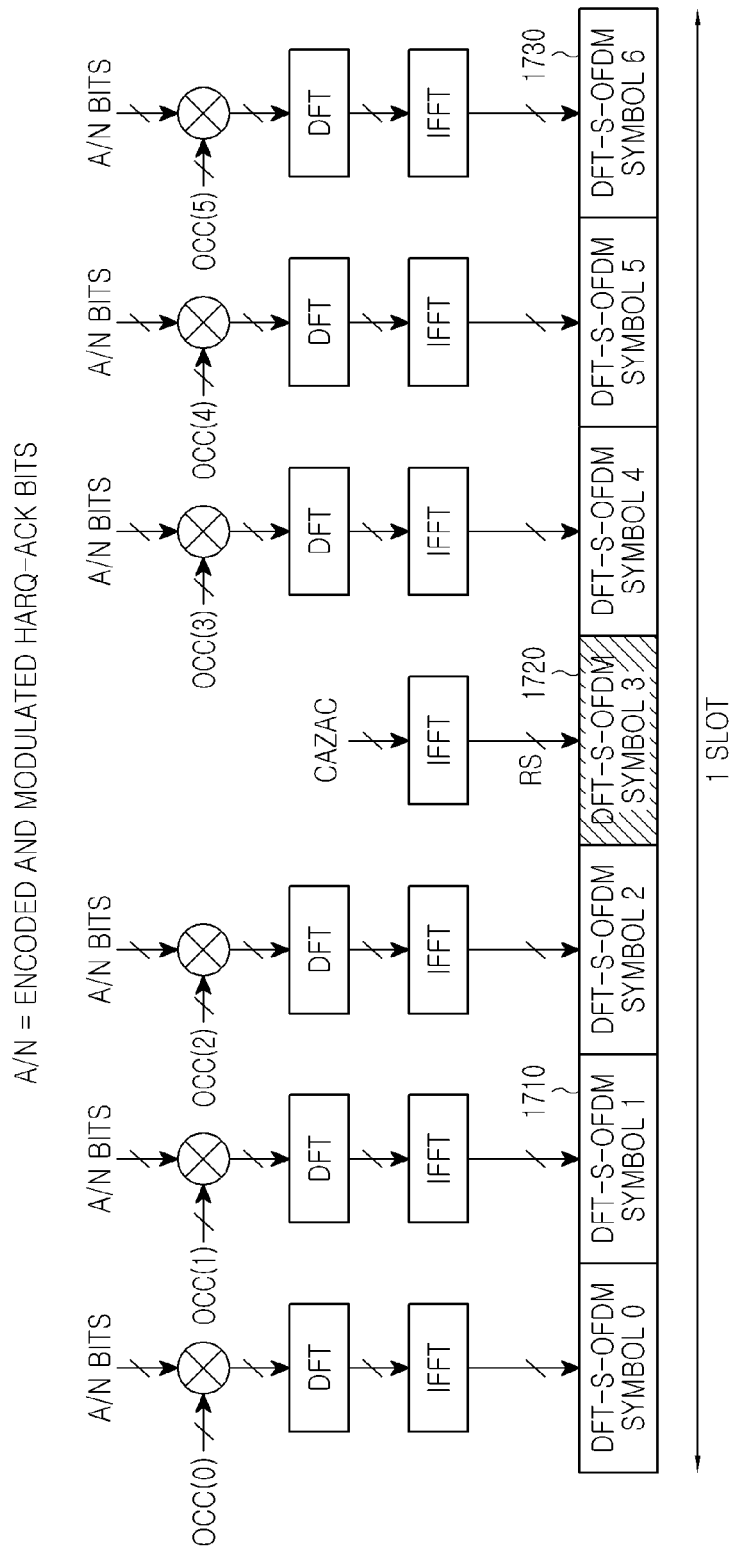
FIG. 17 is a diagram illustrating a structure for maintaining PUCCH multiplexing capacity of 5 orthogonal transmissions per PRB regardless of SRS transmission in a last DFT-S-OFDM symbol of a PUCCH subframe, according to an embodiment of the present invention.

An alternative structure maintaining the PUCCH multiplexing capacity of 5 orthogonal transmissions per PRB regardless of SRS transmission in the last DFT-S-OFDM symbol of the PUCCH subframe is illustrated FIG. 17. As there are 6 DFT-S-OFDM symbols used for HARQ-ACK signal transmission 1710 and only one used for RS transmission 1720, the nominal multiplexing capacity using length-6 OCC is 6, but with suspension of the HARQ-ACK signal transmission in the last DFT-S-OFDM symbol 1730 of the PUCCH subframe in order to accommodate SRS transmission, the multiplexing capacity becomes 5.

Although the configurations in FIG. 16 and FIG. 17 target the maximization of the PUCCH multiplexing capacity, they offer suboptimal performance due to the degraded channel estimation accuracy as the number of DFT-S-OFDM symbols used for RS transmission is reduced. An analytical approximation to the effective SINR, $SINR_{eff}$, of the HARQ-ACK signal transmission in the PUCCH is given in Equation (1).

$$SINR_{eff} = \frac{1}{\frac{1}{SINR_{HARQ-ACK}} + \frac{1}{SINR_{RS}}} \quad (1)$$

In Equation (1), $SINR_{HARQ-ACK}$ and $SINR_{RS}$ is the total received SINR of the HARQ-ACK signal and of the RS, respectively. As an embodiment of the present invention considers 14 DFT-S-OFDM symbols per PUCCH subframe and assumes the same transmission power for the HARQ-ACK signals and the RS, the optimal allocation in term of maximizing $SINR_{eff}$ is to assign an equal number of DFT-S-OFDM symbols to the transmission of HARQ-ACK signals and RS. However, encoding is assumed to be used for the HARQ-ACK information bits, the PUCCH transmission in the first slot is assumed to be at a different part of the operating BW than in the second slot, and the multiplexing capacity is determined by the length of the OCC applied to the DFT-S-OFDM symbols for HARQ-ACK signal transmission. Accordingly, allocating 4 DFT-S-OFDM symbols per slot to HARQ-ACK signal transmission and 3 DFT-S-OFDM symbols per slot to RS transmission practically optimizes $SINR_{eff}$ at low operating SINRs while providing orthogonal multiplexing of 4 transmissions per PRB.

Figure 18:
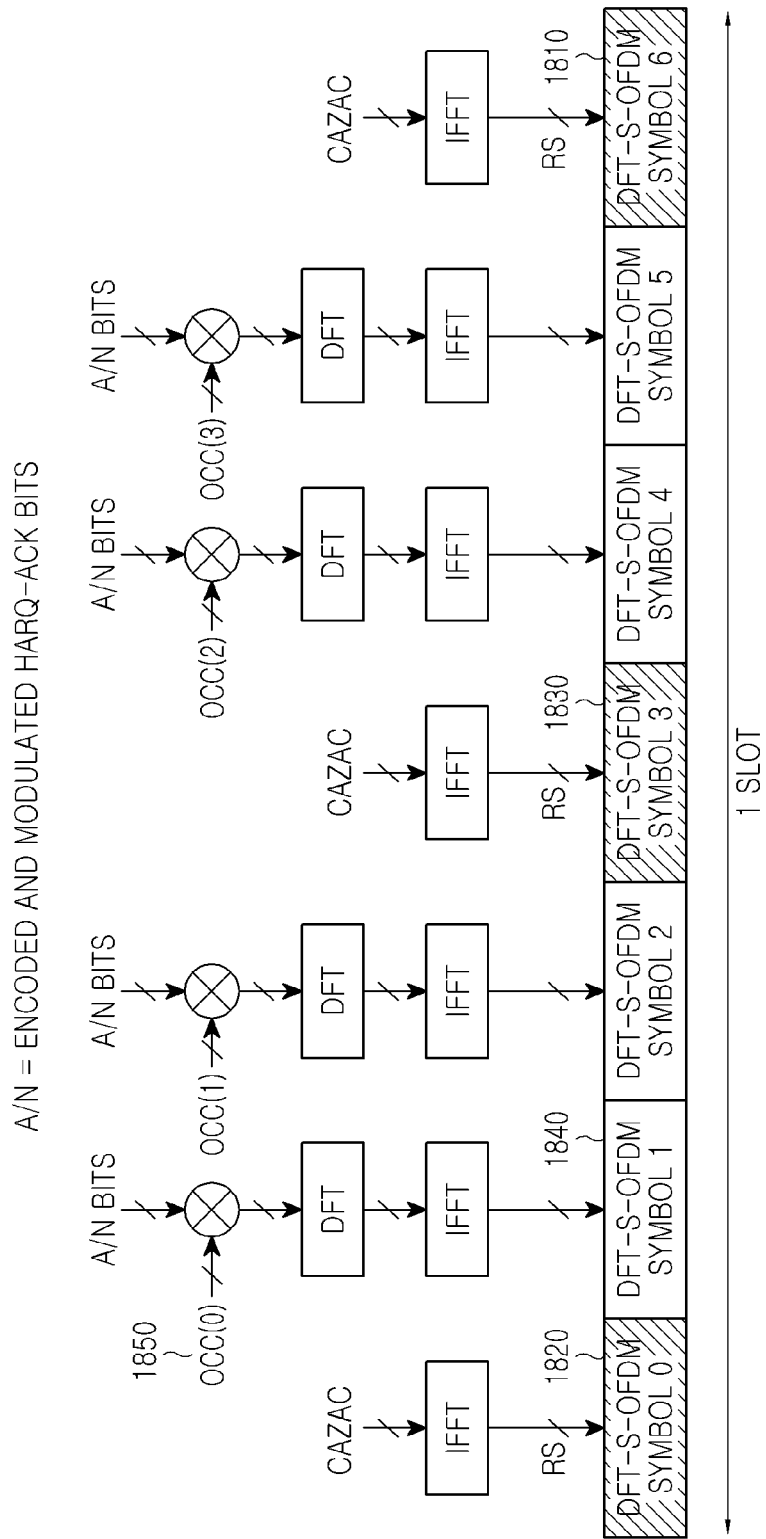
FIG. 18 is a diagram illustrating an allocation of DFT-S-OFDM symbols to transmission of HARQ-ACK signals and RS under a constraint that a last DFT-S-OFDM symbol in a second slot is allocated to an RS transmission, according to an embodiment of the present invention.

FIG. 18 illustrates allocation of DFT-S-OFDM symbols for transmitting HARQ-ACK signals and an RS, according to an embodiment of the present invention.

Referring to FIG. 18, under a constraint that a last DFT-S-OFDM symbol in a second slot of the PUCCH subframe is allocated to RS transmission 1810, the optimal locations for the other two RS transmissions are in the first 1820 and the middle 1830 DFT-S-OFDM symbols in each slot. The remaining DFT-S-OFDM symbols are allocated to HARQ-ACK signal transmission 1840. The length-4 OCC 1850 can be a Walsh-Hadamard code of $\{1, 1, 1, 1\}$, or $\{1, -1, 1, -1\}$, or $\{1, 1, -1, -1\}$, or $\{1, -1, -1, 1\}$. An OCC may also apply to the RS transmission; for example, a length 3 OCC of either $\{1, 1, 1\}$, or $\{1, \exp(j\pi/3), \exp(j2\pi/3)\}$, or $\{1, \exp(j2\pi/3), \exp(j\pi/3)\}$ may be used to increase RS orthogonality.

To support high HARQ-ACK payloads while avoiding an excessive increase in the coding rate, the number of DFT-S-OFDM symbols allocated to RS transmission may be adjusted according to the HARQ-ACK payload. For example, the structure illustrated in FIG. 18 may be used for very small HARQ-ACK payloads, such as, for example, 2-4 bits, the structure illustrated in FIG. 3 or FIG. 16 can be used for medium HARQ-ACK payloads, such as, for example, 5-10 bits, and the structure illustrated in FIG. 17 can be used for large HARQ-ACK payloads, such as, for example, above 10 bits.

Figure 19:
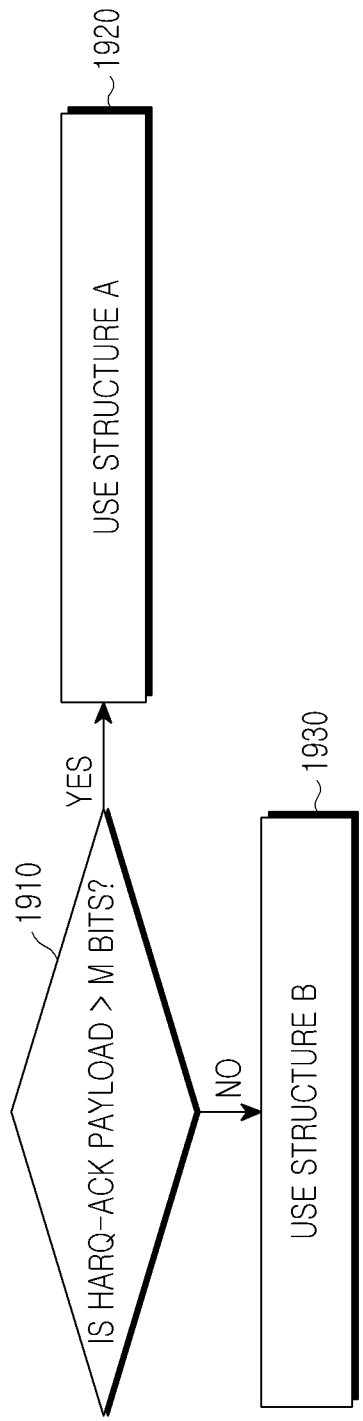
FIG. 19 is a flowchart illustrating a method for adjusting a number of DFT-S-OFDM symbols allocated for transmission of HARQ-ACK signals and of an RS according to a HARQ-ACK payload, according to an embodiment of the present invention.

FIG. 19 is a flow chart illustrating a method for adjusting a number of DFT-S-OFDM symbols allocated for transmitting HARQ-ACK signals and an RS according to a HARQ-ACK payload, according to an embodiment of the present invention.

Referring to FIG. 19, in step 1910, if the HARQ-ACK payload exceeds M bits, PUCCH structure A is used for the HARQ-ACK signal transmission in step 1920; otherwise, PUCCH structure B is used for the HARQ-ACK signal transmission in step 1930. The dependence of the PUCCH structure used for the HARQ-ACK signal transmission may also be based on whether SRS transmission is supported in the same subframe. For example, the PUCCH structure illustrated in FIG. 3 can be used in subframes without SRS transmission, while the structure illustrated in FIG. 18 can be used in subframe with SRS transmission.

Figure 20:
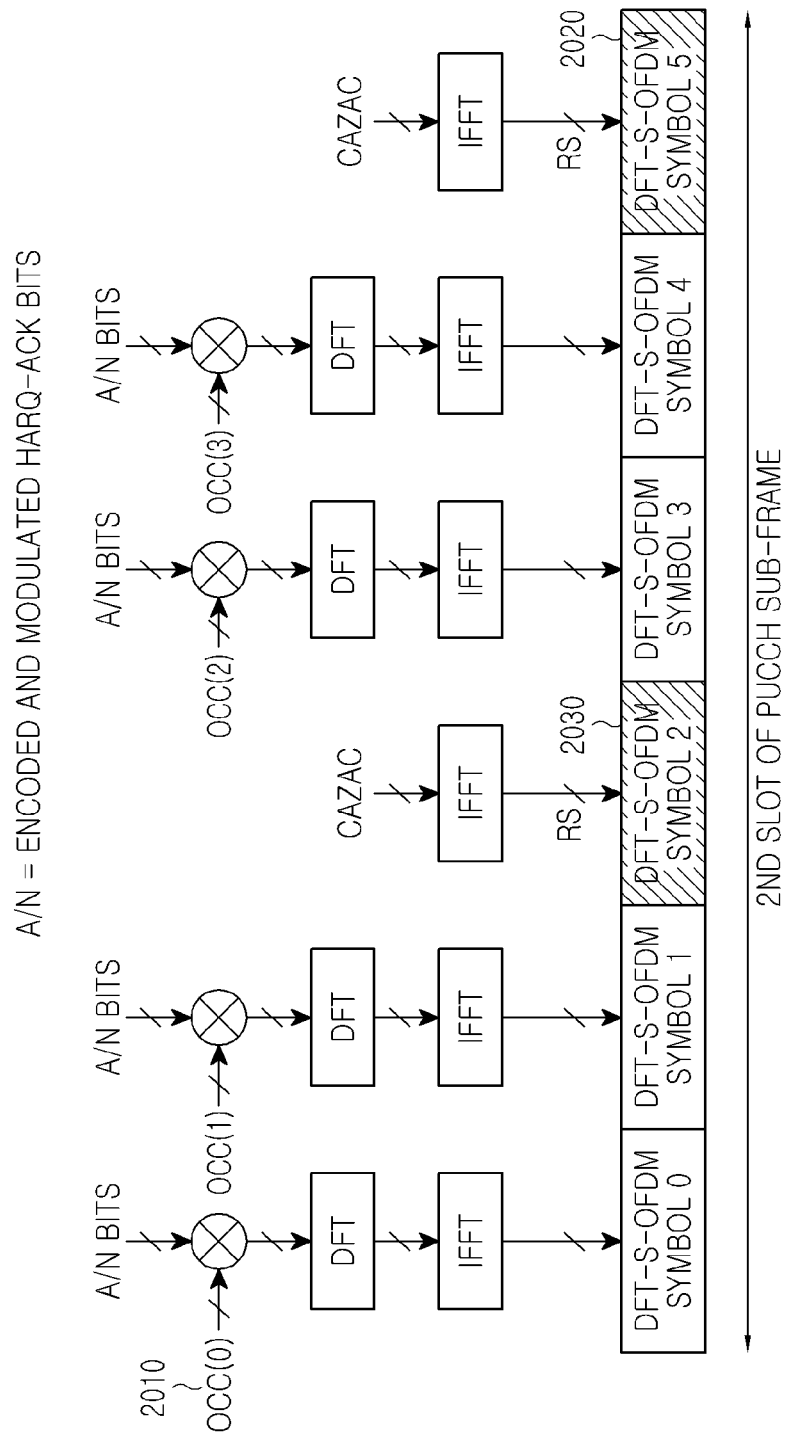
FIG. 20 is a diagram illustrating puncturing of an RS transmission in a last DFT-S-OFDM symbol of a PUCCH subframe in order to transmit an SRS, assuming six DFT-S-OFDM symbols per PUCCH subframe slot, according to an embodiment of the present invention.

The previous design considerations can extend to an alternative structure with 12, instead of 14, DFT-S-OFDM symbols per PUCCH subframe in order to increase the CP length and provide protection from channel propagation effects in highly dispersive environments. For example, the structure illustrated in FIG. 16 can be modified as illustrated in FIG. 20, where there are 4 DFT-S-OFDM symbols allocated to HARQ-ACK signal transmission and the OCC length 2010 is 4, the last symbol in the second slot is allocated to RS transmission 2020, and there is an additional RS transmission per slot 2030.

As multiplexing capacity of a PUCCH structure using a DFT-S-OFDM structure for HARQ-ACK signal transmission is determined based on a length of an OCC applied in a time domain to a HARQ-ACK signal transmission, which is smaller than the number of CS providing orthogonal RS multiplexing, several CS remain available and be used to convey additional information such as for example a Scheduling Request (SR). A conventional approach for a UE to convey a SR together with a HARQ-ACK signal transmission in the PUCCH is to select either the resource allocated to HARQ-ACK signal transmission or the resource allocated to SR signal transmission to indicate respectively a negative or positive SR. This approach relies on using practically the same PUCCH structure, such as, for example, that illustrated in FIG. 2, for the transmissions of HARQ-ACK and SR signals. However, this is no longer applicable as the SR signal transmission is not assumed to use a DFT-S-OFDM structure.

Another conventional approach is to modulate the RS with an OCC to indicate an SR. This approach can still be complementary to utilizing the available CS for RS transmission. Conveying binary information such as an SR using available CS for the RS is also robust to high Doppler shifts, associated with high UE velocities or high carrier frequencies, which cause significant short term variations in the channel medium so that the time-domain orthogonality required for OCC becomes unreliable.

Figure 21:
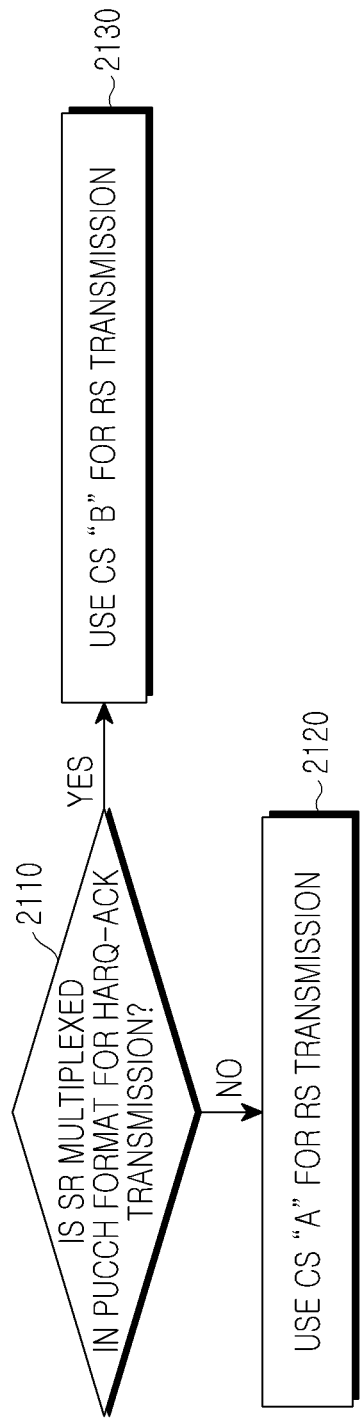
FIG. 21 is a flowchart illustrating a method of using a different CS for RS transmission to indicate a presence or absence of an SR in a subframe where a UE may transmit an SR, according to an embodiment of the present invention.

FIG. 21 illustrates a method of using different CSs for RS transmission (based on a CAZAC sequence) to indicate a presence or absence of an SR in a subframe, where a UE may transmit an SR, according to an embodiment of the present invention. Assuming, for example, that at least 8 CS values are available for orthogonal RS multiplexing and that a length-4 OCC is applied to the HARQ-ACK signal transmission, 4 CS values can be used for orthogonal RS multiplexing when UEs do not indicate SR and the remaining 4 CS values can be used for orthogonal RS multiplexing when UEs indicate SR. Therefore, depending on whether a UE multiplexes an SR in the HARQ-ACK signal transmission using the DFT-S-OFDM structure in step 2110, the UE uses a CS "A" for the RS transmission in step 2120, when no SR is conveyed, and uses CS "B" for the RS transmission in step 2130, when an SR is conveyed. These CS values may have maximal separation or may simply be consecutive CS among the available CS.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for a User Equipment (UE) to simultaneously transmit information of a first type and information of a second type over a number of transmission symbols the method comprising the steps of:
   multiplying, at each transmission symbol, the information of the first type with a respective element of a first Orthogonal Cover Code (OCC) to obtain a first output, wherein the information of the first type and the information of the second type being respectively associated with the first OCC and a second Orthogonal Cover Code (OCC), wherein a length of each OCC is equal to the number of transmission symbols;
   multiplying, at each transmission symbol, the information of the second type with a respective element of the second OCC to obtain a second output;
   summing the first output and the second output to obtain a combined output; and transmitting the combined output, wherein the information of the first type includes acknowledgement information associated with a hybrid automatic repeat request process and the information of the second type includes channel state information.

2. The method of claim 1, wherein the first OCC is dynamically assigned from a predetermined set of OCCs and the second OCC is predetermined.

3. The method of claim 1, wherein the second output is multiplied, at each transmission symbol, with a scaling factor to obtain a scaled second output.

4. The method of claim 3, wherein the scaling factor is equal to a ratio of a UE computed transmission power for the information of the first type over a UE computed transmission power for the information of the second type.

5. The method of claim 1, wherein the combined output is transmitted with power equal to a UE computed transmission power for the information of the first type.

6. A method for a User Equipment (UE) to jointly transmit information in a communication system, the method comprising the steps of:
   receiving a first parameter or a second parameter related to joint transmission of the information;
   jointly transmitting information of a first type and information of a second type, spatial domain bundling being applied to the information of the first type if the UE receives the first parameter set to true, wherein the information of the first type includes acknowledgement information associated with a hybrid automatic repeat request process and the information of the second type includes channel state information;
   jointly transmitting information of the first type and information of the second type, part of the information of the first type being transmitted if the UE receives the second parameter set to true; and
   jointly transmitting information of the first type and information of the second type if the UE receives the first parameter set to false or the second parameter set to false.

7. The method of claim 6, wherein second type include channel state information includes wideband channel quality information and narrowband channel quality information.

8. The method of claim 7, wherein the channel state information includes wideband channel quality information.

9. The method of claim 6, wherein the UE jointly transmits the information of the first type and the information of the second type with a power computed based on the information of the first type.

10. A User Equipment (UE) apparatus for transmitting information of a first type and information of a second type over a number of transmission symbols, the UE apparatus comprising:
    a controller configured to control operations of multiplying, at each transmission symbol, the information of the first type with a respective element of a first Orthogonal Cover Code (OCC) to obtain a first output, multiplying, at each transmission symbol, the information of the second type with a respective element of a second Orthogonal Cover Code (OCC) to obtain a second output, and summing, at each transmission symbol, the first output and the second output to obtain a combined output, wherein the information of the first type and the information of the second type being associated with the first OCC and the second OCC, respectively, wherein a length of each OCC is equal to the number of transmission symbols; and
    and a transmitter configured to transmit the combined output,
    wherein the information of the first type includes acknowledgement information associated with a hybrid automatic repeat request process and the information of the second type includes channel state information.

11. The UE apparatus of claim 10, wherein the first OCC is dynamically assigned from a predetermined set of OCCs and the second OCC is predetermined.

12. The UE apparatus of claim 10, wherein the second output is multiplied, at each transmission symbol, with a scaling factor to obtain a scaled second output.

13. The UE apparatus of claim 10, wherein the scaling factor is equal to a ratio of a UE computed transmission power for the information of the first type over a UE computed transmission power for the information of the second type.

14. The UE apparatus of claim 10, wherein the combined output is transmitted with power equal to a UE computed transmission power for the information of the first type.

15. A User Equipment (UE) apparatus for transmitting information bits in a communication system, the UE apparatus comprising:
- a receiver configured to receive a first parameter or a second parameter related to joint transmission of the information;
- a transmitter configured to jointly transmit information of the first type and information of the second type, wherein the information of the first type includes acknowledgement information associated with a hybrid automatic repeat request process and the information of the second type includes channel state information; and
- a controller configured to control operations of jointly transmitting the information of the first type and the information of the second type, spatial domain bundling being applied to the information of the first type if the receiver receives the first parameter set to true,
  jointly transmitting the information of the first type and information of the second type, part of the information of the first type being transmitted if the receiver receives the second parameter set to true, and
  jointly transmitting the information of the first type and information of the second type if the receiver receives the first parameter set to false or the second parameter set to false.

16. The UE apparatus of claim 15, wherein the second type include channel state information includes wideband channel quality information and narrowband channel quality information.

17. The UE apparatus of claim 16, wherein the channel state information includes the wideband channel quality information.

18. The UE apparatus of claim 15, wherein the UE jointly transmits the information of the first type and the information of the second type with a power computed based on the information of the first type.

* * * * *